US 9,522,616 B2

(12) United States Patent
Kaneda et al.

(10) Patent No.: US 9,522,616 B2
(45) Date of Patent: Dec. 20, 2016

(54) AUTOMOTIVE FOLDING SEAT DEVICE

(75) Inventors: Takuji Kaneda, Tochigi (JP); Kenta Kikuchi, Tochigi (JP); Takeshi Akutsu, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 13/990,127

(22) PCT Filed: Jun. 24, 2011

(86) PCT No.: PCT/JP2011/064531
§ 371 (c)(1),
(2), (4) Date: Jun. 12, 2013

(87) PCT Pub. No.: WO2012/073546
PCT Pub. Date: Jun. 7, 2012

(65) Prior Publication Data
US 2013/0249265 A1    Sep. 26, 2013

(30) Foreign Application Priority Data

Nov. 30, 2010 (JP) .................................. 2010-267689
Dec. 20, 2010 (JP) .................................. 2010-283660
(Continued)

(51) Int. Cl.
*B60N 2/30* (2006.01)
*B60N 2/36* (2006.01)
(Continued)

(52) U.S. Cl.
CPC ........... *B60N 2/3002* (2013.01); *B60N 2/3013* (2013.01); *B60N 2/3038* (2013.01); *B60N 2/3065* (2013.01);
(Continued)

(58) Field of Classification Search
CPC ..... B60N 2/309; B60N 2/3065; B60N 2/3072; B60N 2/3075; B60N 2/3013; B60N 2/3031; B60N 2/3047; B60N 2/3077; B60N 2/3079; B60N 2/3088; B60N 2/36; B60N 2/366; B60N 2/206; B60N 2/22; A47C 1/126
See application file for complete search history.

(56) References Cited

U.S. PATENT DOCUMENTS

| 4,132,447 A | 1/1979 | Terada |
| 4,915,438 A * | 4/1990 | Hashimoto ............. B60N 2/06 180/89.18 |

(Continued)

FOREIGN PATENT DOCUMENTS

| CN | 1576092 A | 2/2005 |
| CN | 1931636 A | 3/2007 |

(Continued)

OTHER PUBLICATIONS

Official Communication dated Mar. 24, 2015 issued to the corresponding Chinese Patent Application 2011800573417.

*Primary Examiner* — David E Allred
(74) *Attorney, Agent, or Firm* — Carrier Blackman & Associates, P.C.; William D. Blackman; Joseph P. Carrier

(57) ABSTRACT

An automotive folding seat device includes a seat support platform that is mounted on a floor, a cushion storage mechanism that is capable of moving a seat cushion from an in-use position to a storage position, a reclining mechanism that is capable of selectively holding a seat back at a raised position and a dropped-down position, and a coupling mechanism that provides a link between the reclining mechanism and the cushion storage mechanism, wherein the floor has formed thereon an elevated surface and a low surface, which is lower than the elevated surface, the seat support platform is mounted on the elevated surface, and the cushion storage mechanism is arranged so as to be capable of moving the seat cushion from the in-use position, which (Continued)

is higher than the elevated surface, to the storage position, which is close to the low surface.

29 Claims, 18 Drawing Sheets

(30) Foreign Application Priority Data

Dec. 20, 2010 (JP) ................................ 2010-283661
Dec. 20, 2010 (JP) ................................ 2010-283662

(51) Int. Cl.
*B60N 2/68* (2006.01)
*B60N 2/70* (2006.01)
*B60N 2/42* (2006.01)

(52) U.S. Cl.
CPC ................ *B60N 2/36* (2013.01); *B60N 2/366* (2013.01); *B60N 2/43* (2013.01); *B60N 2/68* (2013.01); *B60N 2/682* (2013.01); *B60N 2/7094* (2013.01)

(56) References Cited

U.S. PATENT DOCUMENTS

| 5,527,087 | A | 6/1996 | Takeda et al. |
| 6,199,951 | B1* | 3/2001 | Zeile et al. .................. 297/341 |
| 6,234,553 | B1* | 5/2001 | Eschelbach et al. ...... 296/65.14 |
| 6,371,558 | B1 | 4/2002 | Couasnon |
| 7,201,426 | B2* | 4/2007 | Villeminey ................ 296/65.09 |
| 7,255,384 | B2 | 8/2007 | Saberan et al. |
| 7,559,608 | B2 | 7/2009 | Miyahara et al. |
| 7,850,220 | B2 | 12/2010 | Holdampf |
| 9,033,422 | B2* | 5/2015 | Miyazawa ......... B60N 2/01583 296/65.03 |
| 2004/0169391 | A1* | 9/2004 | Imajo et al. ............... 296/65.09 |
| 2005/0006920 | A1 | 1/2005 | Moriyama et al. |
| 2005/0017532 | A1* | 1/2005 | Oyama ..................... 296/65.05 |
| 2006/0061183 | A1* | 3/2006 | White et al. ............ 297/378.12 |
| 2007/0046074 | A1* | 3/2007 | Satta et al. ...................... 297/15 |
| 2008/0169668 | A1 | 7/2008 | Muramatsu |
| 2009/0146477 | A1* | 6/2009 | Yamada et al. ............ 297/354.1 |
| 2013/0001999 | A1* | 1/2013 | Sasaki et al. ............. 297/378.1 |
| 2014/0001809 | A1* | 1/2014 | Line et al. ................ 297/378.1 |

FOREIGN PATENT DOCUMENTS

| CN | 101193771 A | 6/2008 |
| DE | 2738599 C3 | 3/1981 |
| DE | 4333123 C1 | 11/1994 |
| DE | 102006044196 A1 | 5/2007 |
| DE | 112005002760 B4 | 12/2009 |
| JP | 49-036295 B1 | 9/1974 |
| JP | 6-219198 A | 8/1994 |
| JP | 7-223474 A | 8/1995 |
| JP | 9-216529 A | 8/1997 |
| JP | 2827373 B2 | 11/1998 |
| JP | 2900770 B2 | 6/1999 |
| JP | 2001001819 A | 1/2001 |
| JP | 2001171407 A | 6/2001 |
| JP | 2003267097 A | 9/2003 |
| JP | 2004025969 A | 1/2004 |
| JP | 2005-014670 | 1/2005 |
| JP | 2006306250 A | 11/2006 |
| JP | 2007105116 A | 4/2007 |
| JP | 2008168857 A | 7/2008 |

* cited by examiner

AUTOMOTIVE FOLDING SEAT DEVICE

TECHNICAL FIELD

The present invention relates to an improvement of an automotive folding seat device that includes a seat support platform that is mounted on a floor of an automobile body, a seat cushion that is supported on the seat support platform, a cushion storage mechanism that is provided between the seat support platform and the seat cushion and is capable of moving the seat cushion from an in-use position to a storage position, which is lower than the in-use position, a seat back that is supported on the seat support platform so as to be pivotable between a raised position at which the seat back rises above the seat cushion and a dropped-down position at which the seat back is superimposed on the seat cushion, a reclining mechanism that is provided between the seat support platform and the seat back and is capable of selectively holding the seat back at the raised position and the dropped-down position, and a coupling mechanism that provides a link between the reclining mechanism and the cushion storage mechanism so as to move the seat cushion from the in-use position to the storage position in association with pivoting of the seat back from the raised position to the dropped-down position.

BACKGROUND ART

Such a rear folding seat for an automobile is already known, as disclosed in Patent Document 1 below.

PRIOR ART DOCUMENTS

Patent Document

Patent Document 1: Japanese Patent Application Laid-open No. 7-223474

SUMMARY OF THE INVENTION

Problems to be Solved by the Invention

In such a folding seat for an automobile, when the seat is put into a folded state, a rear face of the seat back can conveniently be used as a substantially horizontal place for putting baggage. With regard to a conventional automotive folding seat, even if a seat is put into a folded state, a seat cushion is always held higher than a seat mounting face of a floor.

It is therefore a first object of the present invention to provide an automotive folding seat that can contribute to a lowering of the center of gravity of an automobile by lowering the center of gravity of the entire seat, including baggage, even when baggage is placed on a rear face of a seat back, by making at least a bottom portion of the seat cushion be lower than a seat mounting face of a floor when the seat is in a folded state, and that can also contribute to an increase in the load capacity on the seat back.

Furthermore, in such a conventional automotive folding seat device, holding the seat in an in-use state is carried out just by putting a reclining mechanism into a locked state. However, if it is assumed that a very large forward load will act on the seat at the time of a collision, etc., the load will be concentrated at the reclining mechanism in the locked state; in order to enable the reclining mechanism to withstand the load, the mechanism needs to have very large dimensions, and it is difficult to find a space for installing it.

It is therefore a second object of the present invention to provide an automotive folding seat that, when a very large forward load acts on a seat in an in-use state, can firmly hold the seat in the in-use state by supporting the load in a dispersed manner via parts other than a reclining mechanism.

Moreover, in such an automotive folding seat device, when the seat back is pivoted from a raised position to a dropped-down position, in association therewith a front swing arm pivots from a raised attitude to a rearwardly collapsed attitude and a rear swing arm pivots from a forwardly jutting-out attitude to a hanging-down attitude, thereby moving the seat cushion from an in-use position to a storage position; in this process when the rear swing arm takes the hanging-down attitude, it is superimposed on a seat support platform when viewed from the side, and it is therefore necessary to take steps to avoid rubbing and interference between the rear swing arm and the seat support platform.

It is therefore a third object of the present invention to provide an automotive folding seat that enables the seat to be folded with little effort while simply and reliably preventing rubbing and interference between a rear swing arm and a seat support platform when the rear swing arm takes a hanging-down attitude.

Furthermore, in such a conventional automotive folding seat device, when a cushion storage mechanism moves the seat cushion from the in-use position to the storage position, the seat cushion is moved in parallel. However, with regard to the seat cushion, its upper face is generally inclined upward toward the front when the stability for an occupant when seated is taken into consideration; if the seat cushion is moved in parallel to the storage position as it is, when the seat back is dropped down on the inclined upper face, there is wasted space between the seat cushion and the seat back, thus preventing the seat from becoming compact in a folded state.

It is therefore a fourth object of the present invention to provide an automotive folding seat that can eliminate wasted space between a seat cushion and a seat back when the seat is in a folded state in which the seat cushion is held at a storage position and the seat back is held at a dropped-down position, thereby making the entire seat compact and moreover enabling a rear face of the seat back to be used effectively as a load face for baggage.

Means for Solving the Problems

In order to attain the above first object, according to a first aspect of the present invention, there is provided an automotive folding seat device comprising: a seat support platform that is mounted on a floor of an automobile body; a seat cushion that is supported on the seat support platform; a cushion storage mechanism that is provided between the seat support platform and the seat cushion and is capable of moving the seat cushion from an in-use position to a storage position, which is lower than the in-use position; a seat back that is supported on the seat support platform so as to be pivotable between a raised position at which the seat back rises above the seat cushion and a dropped-down position at which the seat back is superimposed on the seat cushion; a reclining mechanism that is provided between the seat support platform and the seat back and is capable of selectively holding the seat back at the raised position and the dropped-down position; and a coupling mechanism that provides a link between the reclining mechanism and the cushion storage mechanism so as to move the seat cushion from the in-use position to the storage position in association with pivoting of the seat back from the raised position to the dropped-down position, characterized in that the floor has formed thereon an elevated surface and a low surface, which is lower than the elevated surface, the seat support platform is mounted on the elevated surface, the seat cushion is disposed higher than the low surface, and the cushion storage mechanism is arranged so as to be capable of moving the seat cushion from the in-use position, which is higher than the elevated surface, to the storage position, which is close to the low surface. It should be noted here that the seat support platform corresponds to an outer seat support platform 2 of an embodiment of the present invention, which is described later.

Further, according to a second aspect of the present invention, in addition to the first aspect, the elevated surface is formed on opposite sides, in the lateral direction of the automobile body, of the floor, the low surface is a bottom of a recess formed between these left and right elevated surfaces, and when the cushion storage mechanism moves the seat cushion to the storage position, a bottom portion of the seat cushion is housed within the recess.

Furthermore, according to a third aspect of the present invention, in addition to the first or second aspect, the seat cushion is arranged such that at the storage position at least part of the cushion frame is present at a position lower than the elevated surface.

Moreover, according to a fourth aspect of the present invention, in addition to any one of the first to third aspects, a headrest mounted on an upper part of the seat back is arranged so as to protrude from an upper end face of the seat back while bending along a front face thereof, and is disposed so as to be present in front of the seat cushion when the seat back is at the dropped-down position.

Further, according to a fifth aspect of the present invention, in addition to the fourth aspect, the headrest is vertically adjustably mounted on the seat back, and is disposed so as to be present in front of the seat cushion when the seat back is collapsed to the dropped-down position at least at an upward-adjusted position.

Furthermore, according to a sixth aspect of the present invention, in addition to the fourth or fifth aspect, the amount of protrusion of the headrest from the front face of the seat back is set so as to be smaller than a thickness of a front end part of the seat cushion.

Moreover, according to a seventh aspect of the present invention, in addition to any one of the fourth to sixth aspects, a recess is provided at the front end of the seat cushion, the recess being capable of housing the headrest when the seat back is dropped down.

Further, according to an eighth aspect of the present invention, in addition to any one of the fourth to seventh aspects, when the seat back is at the dropped-down position, the seat cushion and the headrest are disposed so that opposing faces thereof in the fore-and-aft direction are in contact with each other.

Furthermore, according to a ninth aspect of the present invention, in addition to any one of the first to eighth aspects, the seat cushion at the storage position and the seat back at the dropped-down position are disposed within the width, in the fore-and-aft direction, of rear wheel houses formed in the automobile body so as to rise up from laterally opposite ends of the floor.

Moreover, according to a tenth aspect of the present invention, in addition to the ninth aspect, the headrest is detachably mounted on the seat back, and in a state in which the headrest is detached, the seat cushion at the storage position and the seat back at the dropped-down position are disposed within the width, in the fore-and-aft direction, of the rear wheel houses formed in the automobile body so as to rise from laterally opposite ends of the floor.

Further, according to an eleventh aspect of the present invention, in addition to the ninth or tenth aspect, the reclining mechanism is provided on an outer face, opposing the rear wheel house, of the seat back.

In order to attain the above second object, according to a twelfth aspect of the present invention, there is provided an automotive folding seat device comprising: a seat support platform that is mounted on a floor of an automobile body; a seat cushion that is supported on the seat support platform; a cushion storage mechanism that is provided between the seat support platform and the seat cushion and is capable of moving the seat cushion from an in-use position to a storage position, which is lower than and to the rear of the in-use position; a seat back that is supported on the seat support platform so as to be pivotable between a raised position at which the seat back rises above the seat cushion and a dropped-down position at which the seat back is superimposed on the seat cushion; a reclining mechanism that is provided between the seat support platform and the seat back and is capable of selectively holding the seat back at the raised position and the dropped-down position; and a coupling mechanism that provides a link between the reclining mechanism and the cushion storage mechanism so as to move the seat cushion from the in-use position to the storage position in association with pivoting of the seat back from the raised position to the dropped-down position, characterized in that the cushion storage mechanism is provided with first movement restricting means, the first movement restricting means restricting the limit of movement of the seat cushion at the in-use position when the seat cushion is moved from the storage position to the in-use position.

Further, according to a thirteenth aspect of the present invention, in addition to the twelfth aspect, the cushion storage mechanism comprises a front swing arm having one end linked to the seat support platform via a first pivot and the other end linked to a front end part of a frame of the seat cushion via a second pivot and, to the rear of the front swing arm, a rear swing arm having one end linked to the seat support platform via a third pivot and the other end linked to a rear end part of the frame via a fourth pivot, pivoting the front swing arm from a raised attitude to a rearwardly collapsed attitude and pivoting the rear swing arm from a forwardly jutting-out attitude to a hanging-down attitude allows the seat cushion to move from the in-use position to the storage position, and the first movement restricting means is provided between the front swing arm and the seat support platform so as to prevent the front swing arm from pivoting forward from a predetermined raised attitude. It should be noted here that the first, second, third and fourth pivots correspond respectively to a fixed pivot 21, a front movable pivot 22, a main shaft 23, and a rear movable pivot 24 of an embodiment of the present invention, which is described later.

Further, according to a fourteenth aspect of the present invention, in addition to the thirteenth aspect, the seat support platform comprises a front support member comprising a base wall fixed to the floor and a support wall rising from the base wall and supporting the first pivot, and the first movement restricting means is formed from a stopper part that is formed on the support wall and prevents the front swing arm from pivoting forward from the predetermined raised attitude by receiving the front swing arm.

Furthermore, according to a fifteenth aspect of the present invention, in addition to the thirteenth aspect, the cushion storage mechanism is provided with second movement restricting means that stops the center of the second pivot above a straight line at the storage position when the second pivot is moved from above to the straight line accompanying movement of the seat cushion from the in-use position to the storage position, the straight line joining centers of the first pivot and the fourth pivot.

Moreover, according to a sixteenth aspect of the present invention, in addition to the fifteenth aspect, the seat support platform is formed from a front support member that supports the first pivot, a rear support member that supports the third pivot, and a linking member that provides a link between these front and rear support members, and the second movement restricting means is formed on each of the linking member and the front swing arm from a pair of stopper parts that abut against each other to thus prevent the front swing arm from pivoting downward from a predetermined collapsed attitude.

Further, according to a seventeenth aspect of the present invention, in addition to the fifteenth aspect, the seat support platform comprises a front support member comprising a base wall fixed to the floor and a support wall rising from the base wall and supporting the first pivot, and the second movement restricting means is formed on the support wall from a stopper part that prevents the front swing arm from pivoting downward from a predetermined collapsed attitude by receiving the front swing arm.

Furthermore, according to an eighteenth aspect of the present invention, according to the thirteenth aspect, front and rear brackets extending in the fore-and-aft direction are welded to a front part and a rear part of an outer face of the frame of the seat cushion respectively, and the second and fourth pivots are secured to the front and rear brackets respectively.

Moreover, according to a nineteenth aspect of the present invention, in addition to the eighteenth aspect, outwardly bulging portions are formed on the front and rear brackets respectively, the second pivot is formed from a bolt that has a head portion thereof secured to an inner wall of the outwardly bulging portion of the front bracket by means of welding or swaging and protrudes outward of the outwardly bulging portion, and the fourth pivot is formed from a bolt that has a head portion welded to an inner wall of the outwardly bulging portion of the rear bracket and protrudes outward of the outwardly bulging portion.

In order to attain the above third object, according to a twentieth aspect of the present invention, there is provided an automotive folding seat device comprising: a seat support platform that is mounted on a floor of an automobile body; a seat cushion; a cushion storage mechanism that is capable of moving the seat cushion from an in-use position to a storage position, which is lower than and to the rear of the in-use position; a seat back; a reclining mechanism that enables the seat back to pivot between a raised position at which the seat back rises above the seat cushion and a dropped-down position at which the seat back is superimposed on the seat cushion; and a coupling mechanism that provides a link between the reclining mechanism and the cushion storage mechanism so as to move the seat cushion from the in-use position to the storage position in association with pivoting of the seat back from the raised position to the dropped-down position, the cushion storage mechanism comprising a front swing arm having one end linked to the seat support platform via a first pivot and the other end linked to a side face of a front end part of a cushion frame of the seat cushion via a second pivot and, to the rear of the front swing arm, a rear swing arm having one end linked to the seat support platform via a third pivot and the other end linked to a side face of a rear end part of the cushion frame via a fourth pivot, pivoting the front swing arm from a raised attitude to a rearwardly collapsed attitude and pivoting the rear swing arm from a forwardly jutting-out attitude to a hanging-down attitude allowing the seat cushion to move from the in-use position to the storage position, and the reclining mechanism comprising a reclining base that is fixedly provided on a side face of a back frame of the seat back and is supported by the third pivot and locking means that is provided on the reclining base and is capable of preventing the seat back at the raised position from pivoting toward the dropped-down position, characterized in that the rear swing arm is disposed offset by a fixed distance inward from an inside face of the seat support platform supporting the third pivot, and the rear swing arm and the reclining base are linked integrally via the coupling mechanism. It should be noted here that the first, second, third, and fourth pivots correspond respectively to a fixed pivot 21, a front movable pivot 22, a main shaft 23, and a rear movable pivot 24 of an embodiment of the present invention, which is described later, and the locking means corresponds to a locking lever 42 of the embodiment.

Further, according to a twenty-first aspect of the present invention, in addition to the twentieth aspect, the predetermined distance is set larger than the amount of protrusion of the fourth pivot projecting from an outer face of the rear swing arm.

Furthermore, according to a twenty-second aspect of the present invention, in addition to the twentieth or twenty-first aspect, the coupling mechanism is formed from a lateral spacer integrally linking the rear swing arm and the reclining base. It should be noted here that the spacer corresponds to a spacer piece 58 and a spacer collar 58' of an embodiment of the present invention, which is described later.

Moreover, according to a twenty-third aspect of the present invention, in addition to the twenty-second aspect, the spacer is formed from a spacer piece that bends inwardly from the reclining base, the rear swing arm is formed so as to bend from the inner end of the spacer piece, and the reclining base, the spacer piece, and the rear swing arm are press-formed from a single plate material.

In order to attain the above fourth object, according to a twenty-fourth aspect of the present invention, there is provided an automotive folding seat device comprising: a seat support platform that is mounted on a floor of an automobile body; a seat cushion; a cushion storage mechanism that is provided between the seat support platform and the seat cushion and is capable of moving the seat cushion from an in-use position to a storage position, which is lower than and to the rear of the in-use position; a seat back that is supported on the seat support platform so as to be pivotable between a raised position at which the seat back rises above the seat cushion and a dropped-down position at which the seat back is superimposed on the seat cushion; a reclining mechanism that is provided between the seat support platform and the seat back and is capable of selectively holding the seat back at the raised position and the dropped-down position; and a coupling mechanism that provides a link between the reclining mechanism and the cushion storage mechanism so as to move the seat cushion from the in-use position to the storage position in association with pivoting of the seat back from the raised position to the dropped-down position, characterized in that the seat cushion comprises a cushion frame that extends along front, rear, left, and right faces of the seat cushion and has the cushion storage mechanism linked thereto, the seat back comprises a back frame that extends along upper, lower, left, and right faces of the seat back and has the reclining mechanism linked thereto, the cushion storage mechanism is arranged so as to hold the cushion frame in a state in which it is inclined upwardly toward the front when the seat cushion is at the in-use position and hold the cushion frame in a substantially horizontal state when at the storage position, and the reclining mechanism is arranged so as to hold the back frame in a substantially horizontal state when the seat back is at the dropped-down position.

Further, according to a twenty-fifth aspect of the present invention, in addition to the twenty-fourth aspect, the cushion frame and the back frame are arranged such that when a seat is in a folded state in which the seat cushion has been moved to the storage position and the seat back has been moved to the dropped-down position, left and right side parts of the cushion frame and left and right side parts of the back frame are superimposed when viewed from above.

Furthermore, according to a twenty-sixth aspect of the present invention, in addition to the twenty-fourth aspect, the cushion storage mechanism comprises a front swing arm having one end linked to the seat support platform via a first pivot and the other end linked to a side face of a front end part of the cushion frame via a second pivot and, to the rear of the front swing arm, a rear swing arm having one end linked to the seat support platform via a third pivot and the other end linked to a side face of a rear end part of the cushion frame via a fourth pivot and having an effective length shorter than the effective length of the front swing arm, and pivoting the second swing arm from a substantially vertical raised attitude to a rearwardly collapsed attitude and pivoting the rear swing arm from a forwardly jutting-out attitude to a hanging-down attitude enables the storage position to be obtained for the seat cushion in which the cushion frame is in a substantially horizontal state.

Moreover, according to a twenty-seventh aspect of the present invention, in addition to the twenty-sixth aspect, when the seat cushion is at the in-use position, the center of the second pivot is disposed so as to have an offset upward relative to a central axis of a side part of the cushion frame, whereas the center of the fourth pivot is disposed so as to have an offset downward relative to the central axis of the side part of the cushion frame.

Effects of the Invention

In accordance with the first aspect of the present invention, when the seat is in the folded state, in which the seat cushion has moved to the storage position and the seat back has been pivoted to the dropped-down position, the seat cushion is held at a position in which it is lower than the elevated surface of the floor, and the dropped-down seat back is superimposed on the seat cushion; even if baggage is placed on the rear face of the seat back, the center of gravity of the entire seat including the baggage can be made lower than that of the conventional arrangement, thus contributing to a lowering of the center of gravity of the automobile and also contributing to an increase of the load capacity on the seat back.

In accordance with the second aspect of the present invention, when the seat is in the folded state, a bottom portion of the seat cushion can be received within a recess between the left and right elevated surfaces, thus contributing to a lowering of the center of gravity of the automobile.

In accordance with the third aspect of the present invention, when the seat cushion is at the storage position, at least a portion of the cushion frame, which is the heaviest among the seat cushion parts, is present at a position lower than the elevated surface, thereby achieving a lowering of the center of gravity of the automobile effectively.

In accordance with the fourth aspect of the present invention, when the seat back is at the dropped-down position, the headrest is present in front of the seat cushion and the lower face of the headrest is positioned lower than the upper face of the seat cushion, and it is therefore possible to prevent interference of the headrest with the seat cushion and achieve a lowering of the center of gravity of the entire seat.

In accordance with the fifth aspect of the present invention, even if the height of the seat back is shorter than the length in the fore-and-aft direction of the seat cushion, adjusting the position of the headrest by moving it upward enables the headrest to be located at a position in front of the seat cushion when the seat back is dropped down, thereby avoiding interference with the seat cushion.

In accordance with the sixth aspect of the present invention, when the seat cushion is housed at the storage position, even if the normal face of the floor connected to the elevated surface is present in front of the seat cushion, it is possible to prevent interference of the headrest with the normal face.

In accordance with the seventh aspect of the present invention, even when a sufficient height of the seat back cannot be ensured and, moreover, the headrest is adjusted at a high position, when the seat back is dropped down, the headrest can be housed in the recess without interfering with the seat cushion, and interference between the headrest and a front seat can easily be avoided.

In accordance with the eighth aspect of the present invention, when the seat back is dropped down, the headrest is made the closest to the front end of the seat cushion, and interference between the headrest and the front seat can easily be avoided.

In accordance with the ninth aspect of the present invention, disposing the seat cushion at the storage position and the seat back at the dropped-down position within the width, in the fore-and-aft direction, of the rear wheel house enables floor space in front of and to the rear of the rear wheel house to be used effectively.

In accordance with the tenth aspect of the present invention, in the dropped-down state of the seat back with the headrest removed, the seat can easily be placed within the width in the fore-and-aft direction of the rear wheel house, and the space on the floor in front of the rear wheel house can be used more effectively.

In accordance with the eleventh aspect of the present invention, it is possible to easily install a reclining mechanism by utilizing effectively dead space between the seat back and the rear wheel house.

In accordance with the twelfth aspect of the present invention, when the seat cushion is moved from the storage position to the in-use position, since the first movement restricting means, which restricts the limit of movement of the seat cushion at the in-use position, is provided on the cushion storage mechanism, when a large forward load acts on the seat, which is in the in-use state, this load is supported while being dispersed among the reclining mechanism in the locked state and the first movement restricting means of the cushion storage mechanism. It is therefore possible to reliably hold the seat in the in-use state while reducing the load burden on the reclining mechanism and avoiding any increase in its size.

In accordance with the thirteenth aspect of the present invention, since the first movement restricting means is provided between the front swing arm and the seat support platform so as to prevent forward pivoting of the front swing arm from a predetermined raised attitude, it is possible to compactly form the first movement restricting means between the front swing arm and the seat support platform.

In accordance with the fourteenth aspect of the present invention, the first movement restricting means can be formed compactly and simply between the seat support platform and the front swing arm.

In accordance with the fifteenth aspect of the present invention, when the seat back is pivoted from the dropped-down position to the raised position, the seat cushion, which moves forward in response to pivoting of the rear swing arm of the cushion storage mechanism forward from the hanging-down attitude, reliably pushes up the front swing arm forward via the second pivot, and the seat cushion can be returned reliably to the in-use position.

In accordance with the sixteenth aspect of the present invention, the second movement restricting means can be formed compactly and simply between the front swing arm and the linking member of the seat support platform.

In accordance with the seventeenth aspect of the present invention, the second movement restricting means can be formed compactly and simply between the front swing arm and the linking member of the seat support platform.

In accordance with the eighteenth aspect of the present invention, the frame of the seat cushion can be reinforced effectively by means of the front and rear brackets extending in the fore-and-aft direction, and due to the second and fourth pivots being secured to the front and rear brackets the support rigidity for the second and fourth pivots can be strengthened.

In accordance with the nineteenth aspect of the present invention, forming the second pivot from a bolt that has its head welded to the inner wall of the outwardly bulging portion of the front bracket and that protrudes outside the outwardly bulging portion and forming the fourth pivot from a bolt that has its head welded to the inner wall of the outwardly bulging portion of the rear bracket and that protrudes outside the outwardly bulging portion enable the support rigidity for the second and fourth pivots to be strengthened to a greater degree, and due to the presence of the outwardly bulging portions of the front and rear brackets, when the seat cushion moves between the in-use position and the storage position, interference between the cushion frame and the first and second swing arms can be avoided, thereby enabling the seat cushion to move smoothly.

In accordance with the twentieth aspect of the present invention, since the rear swing arm is placed so that it is offset by a fixed distance inward from the inside face of the seat support platform supporting the third pivot, and the rear swing arm and the reclining base are integrally linked via the coupling mechanism, the coupling mechanism serves as a spacer between the rear swing arm and the reclining base, and therefore when the seat is folded it is possible to simply and reliably avoid rubbing and interference between the seat support platform and the rear swing arm, which goes toward the hanging-down attitude, thereby enabling folding of the seat to be carried out with little effort.

In accordance with the twenty-first aspect of the present invention, when the seat is folded, rubbing and interference of the seat support platform with not only the rear swing arm going toward the hanging-down attitude but also the fourth pivot protruding outside the rear swing arm can be simply and reliably prevented.

In accordance with the twenty-second aspect of the present invention, since the coupling mechanism becomes a lateral spacer, rubbing and interference between the rear swing arm and the seat support platform can be simply and reliably prevented.

In accordance with the twenty-third aspect of the present invention, since the reclining base, the spacer piece, and the rear swing arm are press-formed from a single plate material, it is possible to contribute to a reduction in the number of components and to making the structure simple and compact.

In accordance with the twenty-fourth aspect of the present invention, in the folded state of the seat, in which the seat cushion is held at the storage position and the seat back is held at the dropped-down position, both the cushion frame and the back frame are held in a substantially horizontal state, and both frames are thereby substantially in parallel and the closest to each other; this enables the entire seat to be folded compactly while eliminating any wasted space between the seat cushion and the seat back. Moreover, the rear face of the seat back can be utilized effectively as a substantially horizontal baggage load face, thus improving the loading performance for baggage.

In accordance with the twenty-fifth aspect of the present invention, when the seat is in the folded state, since left and right side parts of the cushion frame and opposite side parts of the back frame are superimposed when viewed from above, not only is it possible to fold the seat more compactly, but it is also possible by means of the two frames to reliably support the weight of baggage loaded on the rear face of the seat back.

In accordance with the twenty-sixth aspect of the present invention, since the effective length of the rear swing arm, which pivots from the substantially vertical raised attitude to the rearwardly collapsed attitude, is shorter than the effective length of the front swing arm, which pivots from the forwardly jutting-out attitude to the hanging-down attitude, in contrast to the second pivot, which moves rearward and downward to a great extent, the amount of downward movement of the fourth movable pivot is smaller than that of the front movable pivot and the amount of rearward movement thereof is substantially equal to that of the second movable pivot, and as a result the cushion frame, which is inclined upward toward the front when the seat cushion is at the in-use position, can be put into a substantially horizontal state at the storage position.

In accordance with the twenty-seventh aspect of the present invention, since the effective length of the front swing arm becomes longer by an amount corresponding to the upward offset of the center of the second pivot relative to the central axis of the side part of the cushion frame, when the seat cushion goes toward the storage position, the amounts of rearward and downward movement of the second pivot increase, and when the seat cushion goes toward the storage position the rearward movement limit of the fourth pivot moves rearward by an amount corresponding to the downward offset of the center of the fourth pivot relative to the central axis of the side part of the cushion frame; as a result it becomes possible to move the cushion frame, which is inclined upward toward the front when the seat cushion is at the in-use position, sufficiently downward and rearward while keeping it in a substantially horizontal state at the storage position, thus contributing to an improvement of the storage properties of the seat cushion.

EXPLANATION OF REFERENCE NUMERALS AND SYMBOLS

Figure 1:
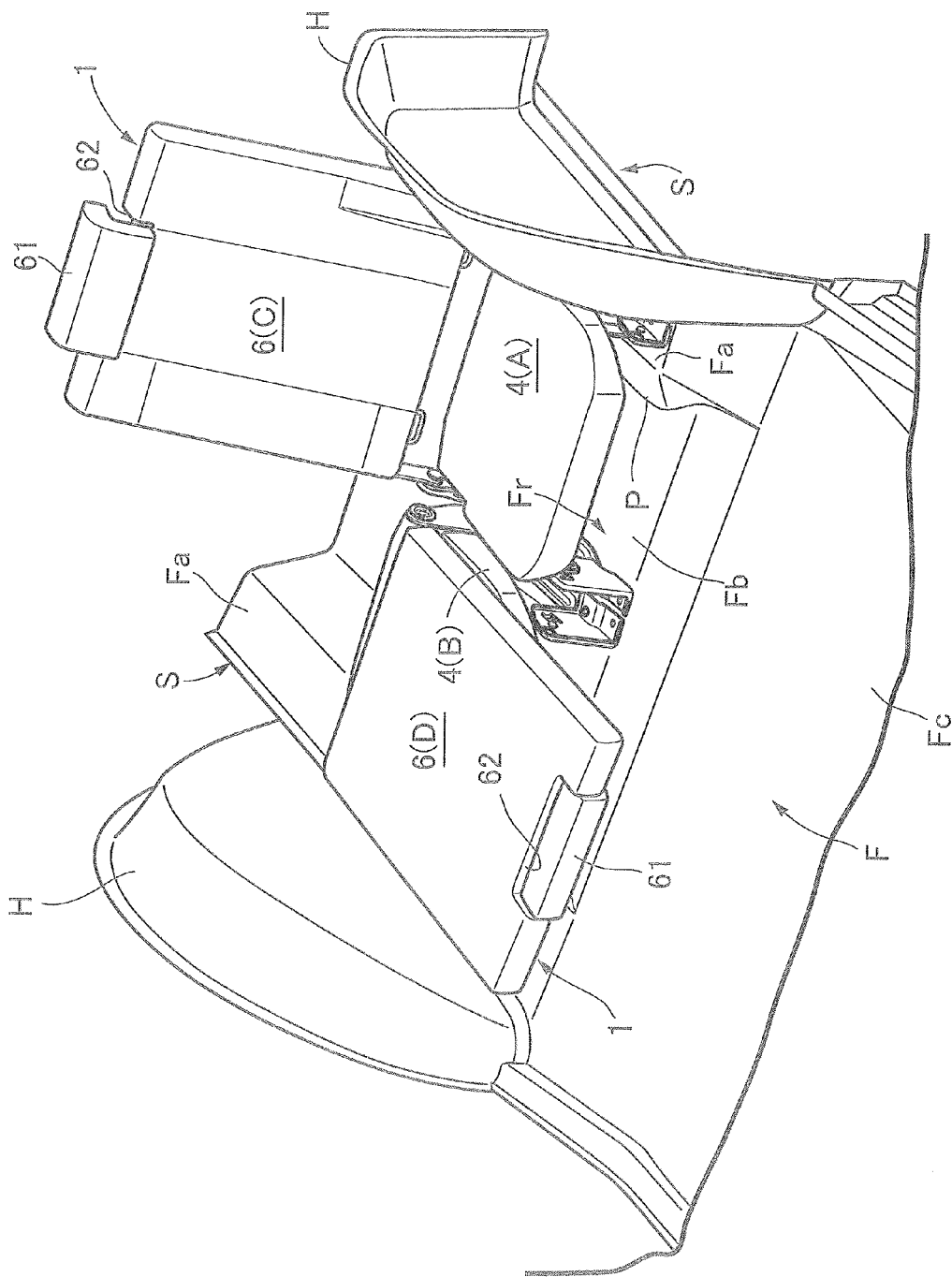
FIG. 1 is a perspective view of a folding seat for an automobile related to an embodiment of the present invention.

A Seat cushion at in-use position
B Seat cushion at storage position
C Seat back at raised position
D Seat back at dropped-down position
F Floor
Fa Elevated surface
Fb Low surface
Fr Recess
L Straight line
S1 Thickness of front end of seat cushion
S2 Amount of forward protrusion of headrest
Y Central axis of side part of cushion frame
e Amount of offset
1 Seat
2 Seat support platform (outer seat support platform)
2' Seat support platform (inner seat support platform)
4 Seat cushion
4a Bottom portion of seat cushion
5 Cushion storage mechanism
6 Seat back
7 Reclining mechanism
8 Coupling mechanism
10, 10' Front support member
11, 11' Rear support member
12, 12' Linking member
14 Frame of seat cushion (cushion frame)
15 Front bracket
15a Outwardly bulging portion
16 Rear bracket
16a Outwardly bulging portion
17 Back frame
19 Front swing arm
20 Rear swing arm
21 First pivot (fixed pivot)
22 Second pivot (front movable pivot)
23 Third pivot (main shaft)
24 Fourth pivot (rear movable pivot)
28 First movement restricting means (stopper part)
29, 30 Second movement restricting means (stopper part)
31 Second movement restricting means (stopper part)
42 Locking means (locking lever)
58 Spacer (spacer piece)
58' Spacer (spacer collar)
61 Headrest
63 Recess

MODES FOR CARRYING OUT THE INVENTION

Modes for carrying out the present invention are explained below by reference to the attached drawings. In the explanation below, front and rear (longitudinal) and left and right (lateral) are referred to with respect to an automobile in which the folding seat of the present invention is installed.

Figure 7:
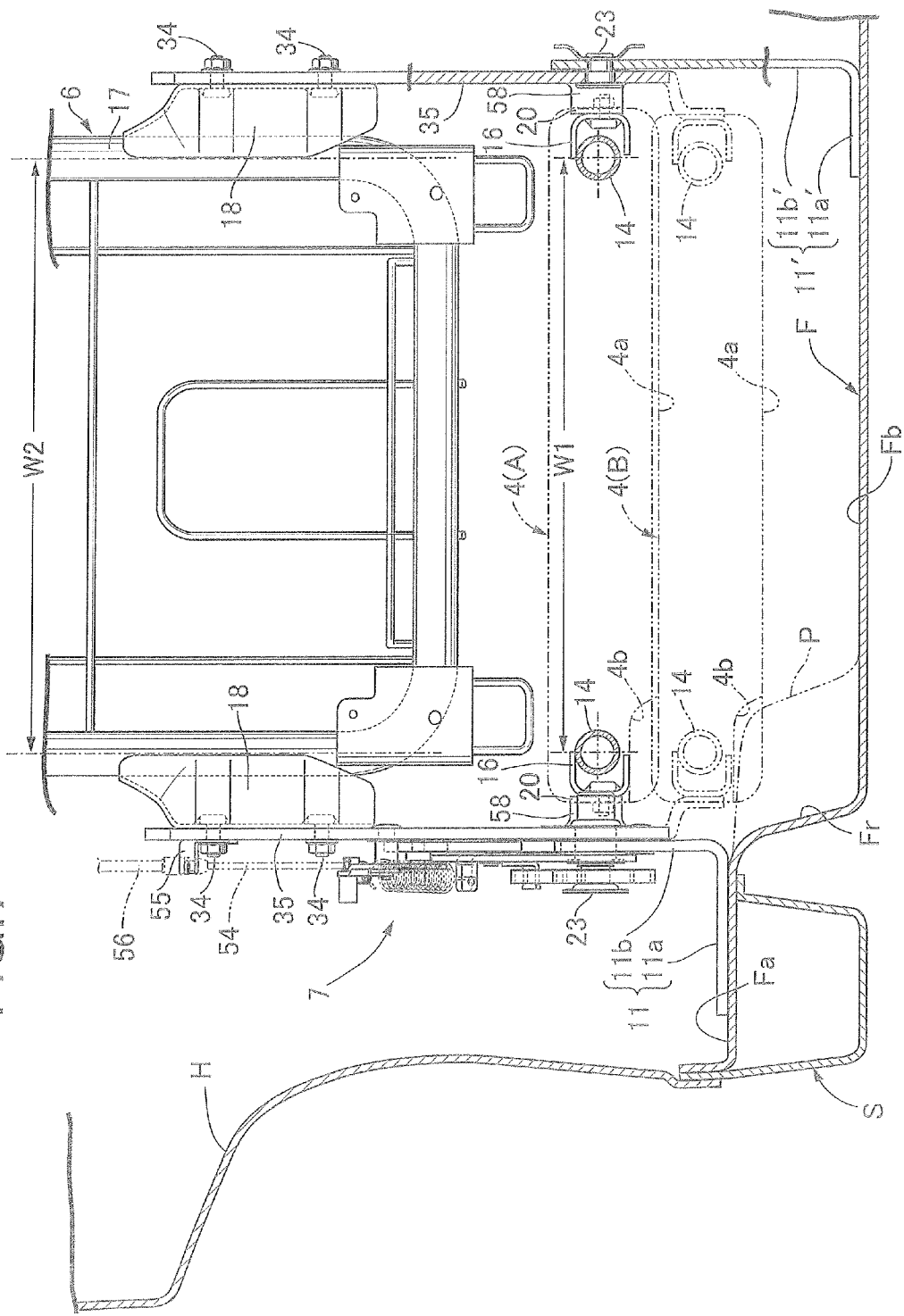
FIG. 7 is a sectional view along line 7-7 in FIG. 6.
Figure 8:
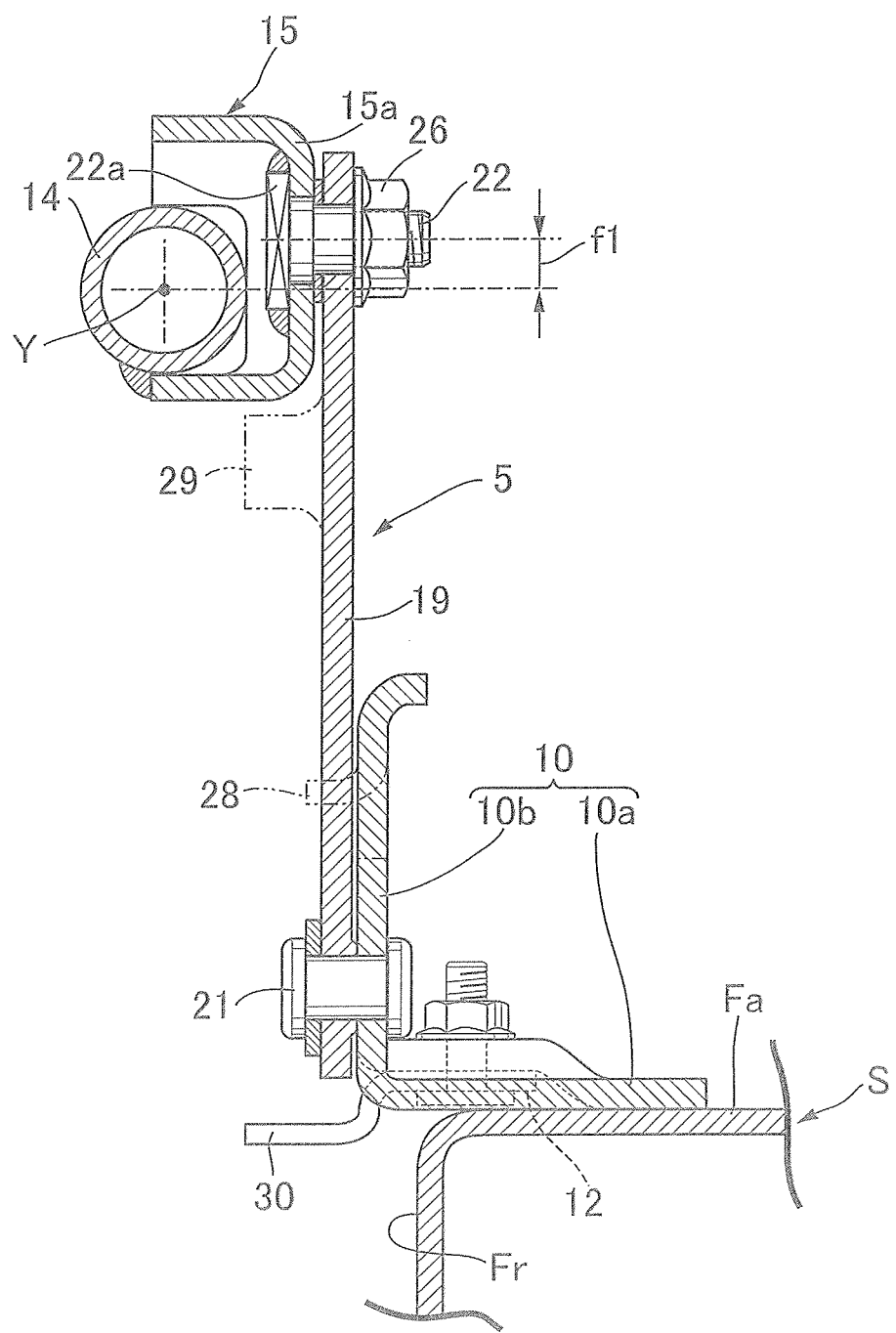
FIG. 8 is an enlarged sectional view along line 8-8 in FIG. 6.
Figure 13:
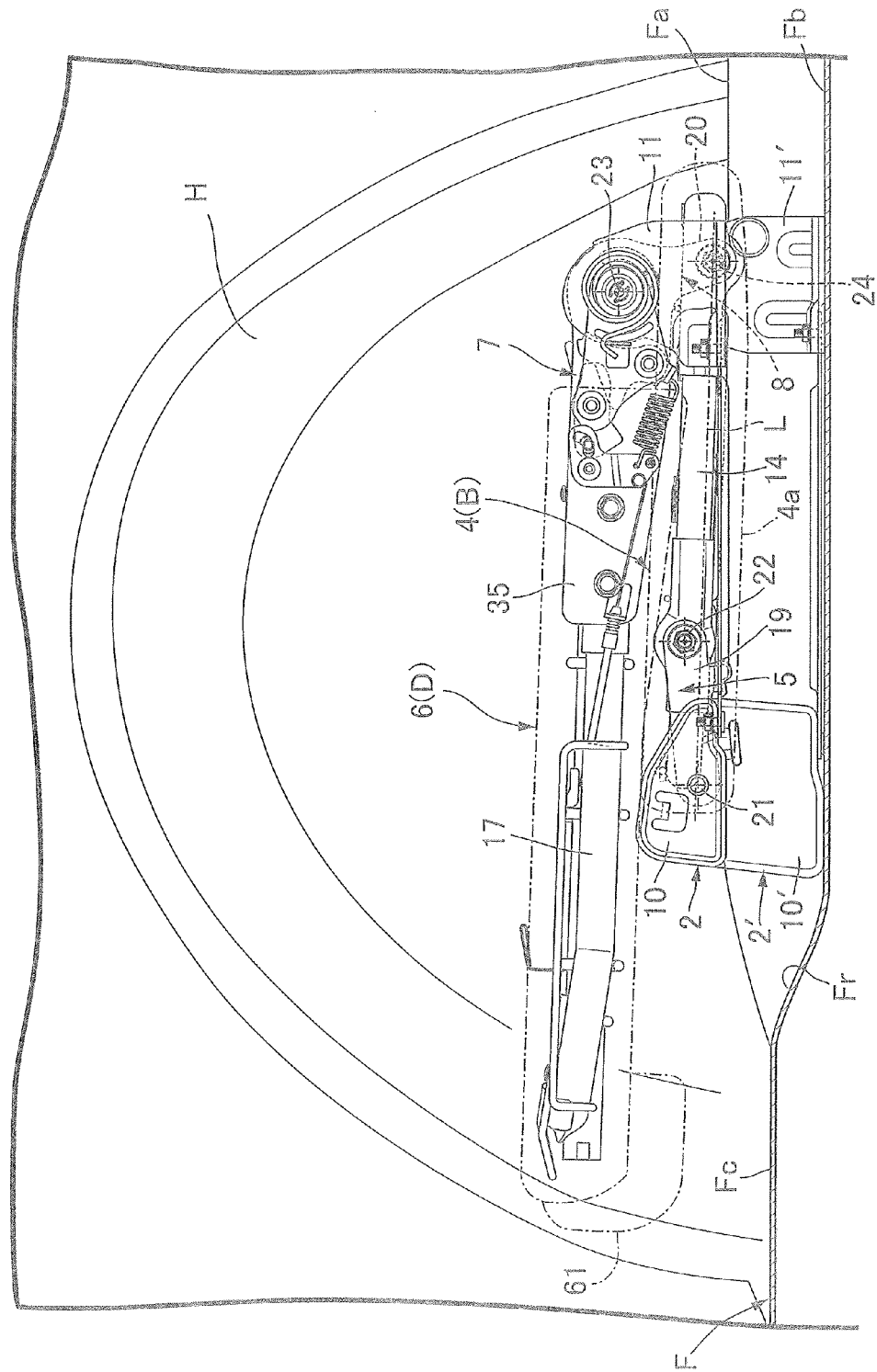
FIG. 13 is a side face showing the seat in a folded state.

First, in FIG. 1, FIG. 7, and FIG. 13, a body of an automobile has left and right side sills S and S and a pair of rear wheel houses H and H each rising from outside edges of the side sills S and S and covering left and right rear wheels, which are not illustrated, a floor F is formed between the left and right side sills S and S so as to include upper faces thereof, and a pair of left and right folding seats 1 and 1 related to the present invention are disposed on the floor F.

The floor F includes narrow elevated surfaces Fa and Fa that are connected to bases of the rear wheel houses H and H and extend in the fore-and-aft direction, and a wide low surface Fb that is formed between the elevated surfaces Fa and Fa, the low surface Fb serving as a bottom Fb of a recess Fr formed between the elevated surfaces Fa and Fa. The elevated surface Fa has its front end side inclined downward toward the front and connected to a normal face Fc of the floor F on the whole seat side, the recess Fr becoming shallow toward the front, and the bottom Fb is also connected to the normal face Fc. A bulging part P is formed on a front part of a step between the elevated surface Fa and the low surface Fb, and this bulging part P houses and holds a support part of a rear suspension mechanism (not illustrated) by means of a recess outside the bulging part P.

Figure 2:
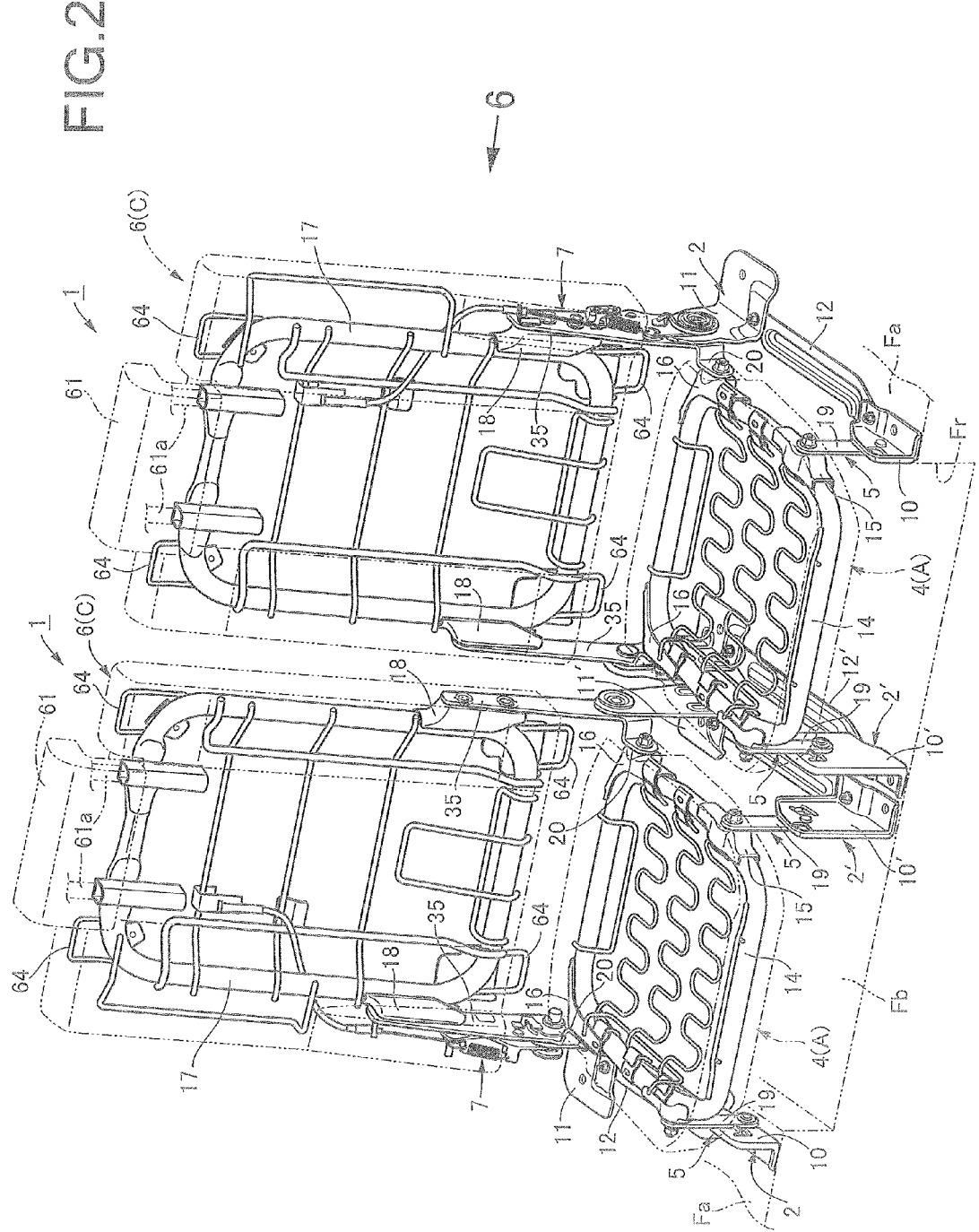
FIG. 2 is a perspective view showing the internal structure of the folding seat.

As shown in FIG. 1 and FIG. 2, the pair of left and right folding seats 1 and 1 are formed symmetrically. Each seat 1 is formed from outer and inner seat support platforms 2 and 2' mounted on the elevated surface Fa and the low surface Fb respectively, a seat cushion 4 disposed higher than the recess Fr, cushion storage mechanisms 5 and 5 providing a link between the seat cushion 4 and each of the outer and inner seat support platforms 2 and 2', a seat back 6 supported by the outer and inner seat support platforms 2 and 2' in the vicinity of a rear end part of the seat cushion 4, a reclining mechanism 7 providing a link between the seat back 6 and each of the outer and inner seat support platforms 2 and 2', and a coupling mechanism 8 providing a link between the reclining mechanism 7 and the cushion storage mechanism 5.

As shown in FIG. 3 to FIG. 6, the cushion storage mechanism 5 can hold the seat cushion 4 at an in-use position A (see FIG. 6 and FIG. 7) and at a storage position B (see FIG. 7 and FIG. 13) in turn; at the in-use position A a bottom portion 4a of the seat cushion 4 is positioned higher than the elevated surface Fa, and at the storage position B at least the bottom portion 4a occupies a position close to the low surface Fb lower than the elevated surface Fa.

Furthermore, the reclining mechanism 7 can hold the seat back 6 at a raised position (see FIG. 1 and FIG. 6) and at a dropped-down position D (see FIG. 1 and FIG. 13) in turn; at the raised position C the seat back 6 rises upward and slightly to the rear from the vicinity of the rear end part of the seat cushion 4, and at the dropped-down position D the seat back 6 is superimposed on an upper face of the seat cushion 4. The coupling mechanism 8 allows the seat cushion 4 to move between the in-use position A and the storage position B in association with pivoting of the seat back 6 between the raised position C and the dropped-down position D. Details thereof are described later. A state in which the seat back 6 is collapsed to the dropped-down position D and the seat cushion 4 is lowered to the storage position B is called a folded state of the seat 1.

As is clearly shown in FIG. 2, the left and right inner seat support platforms 2 and 2' are disposed in a central portion in the lateral direction of the low surface Fb so as to be close to each other. As shown in FIG. 2 to FIG. 7, the outer and inner seat support platforms 2 and 2' are formed from front support members 10 and 10', rear support members 11 and 11' disposed to the rear thereof, and linking members 12 and 12' providing a link between these front and rear support members 10 and 10'; 11 and 11'. The front support members 10 and 10' are formed from horizontal base walls 10a and 10a' and support walls 10b and 10b' rising from inner ends of the base walls 10a and 10a' so as to bend upward, and the base walls 10a and 10a' are joined by means of a bolt to the corresponding elevated surface Fa and low surface Fb. The rear support members 11 and 11' are formed from horizontal base walls 11a and 11a', which are wider than the base walls 10a and 10a', and support walls 11b and 11b', which rise from ends on one side of the base walls 11a and 11a' and bend upward so as to be higher than the support walls 10b and 10b', and the base walls 11a and 11a' are joined by means of a bolt to the corresponding elevated surface Fa and low surface Fb. The front and rear support members 10' and 11' of the inner seat support platform 2' are formed so as to be longer in the vertical direction by an amount corresponding to the step between the low surface Fb and the elevated surface Fa than the front and rear support members 10 and 11 of the outer seat support platform 2. This enables the seat cushion storage mechanism 5, which provides a link between the outer seat support platform 2 and the seat cushion 4, and the seat cushion storage mechanism 5, which provides a link between the inner seat support platform 2' and the seat cushion 4, to be formed symmetrically with the same dimensions.

The seat cushion 4 has a frame 14 (hereinafter, called a cushion frame 14) formed by bending a metal pipe material into a quadrilateral along the front, rear, left, and right faces, front brackets 15 and 15 are welded to front outer faces of left and right side parts thereof, and rear brackets 16 and 16 are welded to left and right corners on the rear side. The front bracket 15 extends lengthwise in the fore-and-aft direction, and an outwardly bulging portion 15a is formed on an intermediate part thereof in the longitudinal direction. Furthermore, the rear bracket 16 is formed into an L shape from a front half extending in the lateral direction and welded to an outer face of the cushion frame 14 and a rear half extending in the lateral direction and welded to a rear face of the cushion frame 14, and an outwardly bulging portion 16a is formed on a rear end part of the front half. The front and rear brackets 15 and 16 reinforce the cushion frame 14 effectively.

Furthermore, the seat back 6 also has a frame 17 (hereinafter, also called a back frame 17) formed by bending a metal pipe into a quadrilateral along upper, lower, left, and right faces thereof, and side brackets 18 and 18 are welded to lower parts of left and right side faces thereof.

The cushion frame 14 and the back frame 17 are set so that lateral widths W1 and W2 (see FIG. 7) of the cushion frame 14 and the back frame 17 are substantially equal to each other such that when the seat 1 is in the folded state left and right side parts of the cushion frame 14 and left and right side parts of the back frame 17 are superimposed when viewed from above.

In FIG. 3 to FIG. 10, the seat cushion storage mechanism 5 is formed from front swing arms 19 and 19 that provide a link between the support walls 10b and 10b' of the front support members 10 and 10' and the front brackets 15 and 15, and rear swing arms 20 and 20 that provide a link between the support walls 11b and 11'b of the rear support members 11 and 11' and the rear brackets 16 and 16. Each front swing arm 19 has one end linked pivotably in the fore-and-aft and vertical directions to the front support member 10, 10' via a fixed pivot 21 and its other end linked pivotably in the fore-and-aft and vertical directions to the front bracket 15 via a front movable pivot 22. Furthermore, the rear swing arm 20 has one end linked pivotably in the fore-and-aft and vertical directions to the support wall 11b, 11b' of the rear support member 11, 11' via the main shaft 23 and its other end linked pivotably in the fore-and-aft and vertical directions to the rear bracket 16 via the rear movable pivot 24. The main shaft 23 is secured to the support wall 11b, 11b'. In this arrangement, the effective length of each rear swing arm 20, that is, the distance between the axes of the main shaft 23 and the rear movable pivot 24, is set so as to be shorter than the effective length of each front swing arm 19, that is, the distance between the axes of the fixed pivot 21 and the front movable pivot 22.

The fixed pivot 21, which supports a lower end part of the front swing arm 19, is formed from a rivet secured to the support member 10a, 10a'.

Furthermore, the front movable pivot 22, which supports the upper end of the front swing arm 19, is formed from a bolt that extends through the outwardly bulging portion 15a of the front bracket 15 and has a head portion 22a secured to the inner wall thereof by welding or swaging, this strengthening the support rigidity for the front movable pivot 22. Screwing a nut 26 around a forward end part of the front movable pivot 22 allows an upper end part of the front swing arm 19 to be mounted. In this arrangement, the front movable pivot 22 is disposed so that its center is offset by a fixed distance f1 upward relative to a central axis Y of the pipe material forming the cushion frame 14 (see FIG. 6 and FIG. 8).

Furthermore, the rear movable pivot 24, which supports a front end part of the rear swing arm 20, is formed from a bolt that extends through the outwardly bulging portion 16a of the rear bracket 16 and has a head portion 24a secured to the inner wall thereof by welding or swaging, this strengthening the support rigidity for the rear movable pivot 24. Screwing a nut 27 around a forward end part of the rear movable pivot 24 allows a front end part of the rear swing arm 20 to be mounted. In this arrangement, the rear movable pivot 24 is disposed so that its center is offset by a fixed distance f2 downward relative to the central axis of the pipe material forming the cushion frame 14 (see FIG. 6 and FIG. 10).

The outwardly bulging portions 15a and 16a of the brackets 15 and 16 not only strengthen the support rigidity for the respective movable pivots 22 and 24 but also have the function of being a distance piece that enables interference between the front and rear swing arms 19 and 20 and the cushion frame 14 to be avoided when the front and rear swing arms 19 and 20 are pivoted.

As shown in FIG. 2 to FIG. 6, the in-use position A of the seat cushion 4 is controlled by raising the front swing arm 19 above the fixed pivot 21 in a substantially vertical state (in the illustrated example, it is tilted slightly to the rear of the fixed pivot 21) and collapsing the rear swing arm 20 toward the front of the main shaft 23 substantially horizontally such that the bottom portion 4a of the seat cushion 4 occupies a position higher than the elevated surface Fa. In this arrangement, in order to restrict the limit of forward pivoting of the front swing arm 19 the cushion storage mechanism 5 is provided with first movement restricting means 28.

Specifically, the first movement restricting means 28 is provided between the seat support platforms 2 and 2' and the corresponding front swing arms 19 and 19. More specifically, the first movement restricting means 28 is formed from a stopper part 28 that is cut out of the support wall 10b, 10b' of the front support member 10, 10' and raised, the stopper part 28 receiving a front edge part of each front swing arm 19 to thus restrict the limit of forward pivoting of the front swing arm 19. When the seat cushion 4 is at the in-use position A, the cushion frame 14 is held in a state in which it is inclined upward toward the front. Therefore, the upper face of the seat cushion 4 is also inclined upward toward the front.

As shown in FIG. 13, when the seat cushion 4 is at the storage position B, pivoting the front swing arm 19 to the rear of the fixed pivot 21 in a substantially horizontal state (in the illustrated example, the front movable pivot 22 side is slightly upward) and pivoting the rear swing arm 20 to substantially directly beneath the main shaft 23 (in the illustrated example, beneath and slightly to the rear of the main shaft 23) controls the bottom portion 4a of the seat cushion 4 so that it occupies a low position close to the low surface Fb, that is, so that it is received within the recess Fr.

In this arrangement, second movement restricting means for restricting the limit of downward pivoting of the front swing arm 19 is provided between the outer seat support platform 2 and the corresponding front swing arm 19 and between the inner seat support platform 2' and the corresponding front swing arm 19. Specifically, the second movement restricting means is formed from a stopper part 29 formed by bending the front swing arm 19 (see FIG. 4) and an inward stopper part 30 formed on the linking member 12 of the outer seat support platform 2, the limit of downward pivoting of the front swing arm 19 being restricted due to the stopper 30 and the stopper part 29 abutting against each other, and the second movement restricting means is also formed from a stopper part 31 (see FIG. 5) formed by cutting out and raising the support wall 10b' of the front support member 10' of the inner seat support platform 2', the limit of downward pivoting of the front swing arm 19 being restricted due to a lower edge part of the front swing arm 19 abutting thereagainst. Since the limit of downward pivoting of the front swing arm 19 is thus restricted, the center of the front movable pivot 22 is set so as not to go lower than a straight line L joining the centers of the fixed pivot 21 and the rear movable pivot 24. That is, the center of the front movable pivot 22 is prevented from descending further when it is above the straight line L.

The cushion storage mechanism 5 is arranged so that, when the seat cushion 4 is lowered to the storage position B, the bottom portion of the seat cushion 4, in particular part of the cushion frame 14, is lowered to a position lower than the elevated surface Fa, and the cushion frame 14 is held in a substantially horizontal state similarly to the low surface Fb.

As shown in FIG. 7, provided on the bottom of the seat cushion 4 is a clearance 4b for avoiding interference with the bulging part P when the seat cushion 4 gets to the storage position B.

Figure 14:
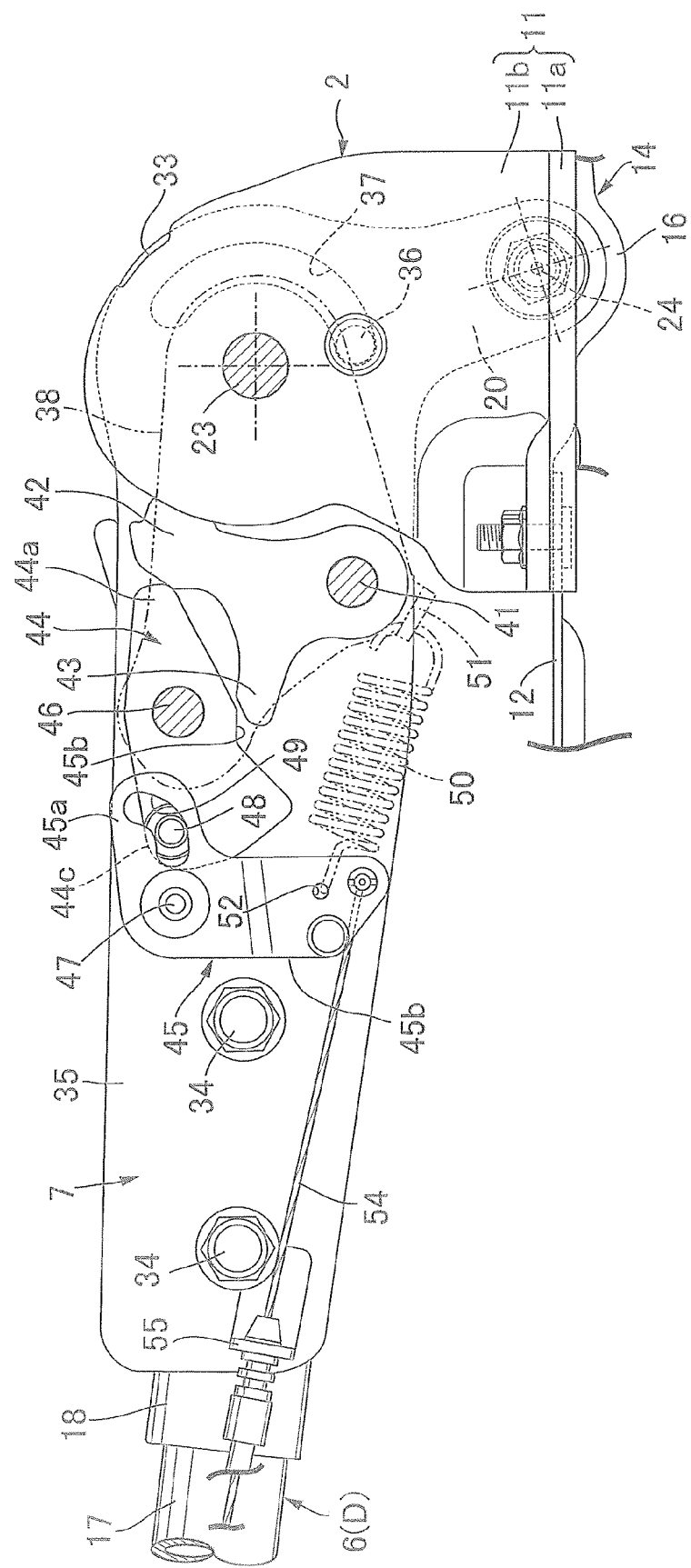
FIG. 14 is an enlarged view of the reclining mechanism part of FIG. 13.

In FIG. 6, FIG. 9, FIG. 11, and FIG. 12, the reclining mechanism 7 includes a pair of left and right reclining bases 35 and 35 secured to outer faces of the left and right side brackets 18 and 18 of the seat back 6 by means of a plurality of bolts 34. The reclining base 35 is superimposed on an inside face of the support wall 11b, 11b' of each of the inner and outer rear support members 11 and 11' and pivotably supported on the main shaft 23 fixedly provided on each of the support walls 11b and 11b'. The support wall 11b of the outer rear support member 11 is fixedly provided with a stopper pin 36 protruding from its inside face, whereas the outer reclining base 35 is provided with a long hole 37 having an arc shape concentric with the main shaft 23 and engaging with the stopper pin 36. The stopper pin 36 abuts against one of inner end walls of the long hole 37, thereby restricting the raised position C (see FIG. 11) of the seat back 6, the stopper pin 36 abuts against the other inner end wall of the long hole 37, thereby restricting the dropped-down position D (see FIG. 14) of the seat back 6, and in this state the back frame 17 and a rear face of the seat back 6 are held in a substantially horizontal state.

An auxiliary base 38 is secured to an outer face of the outer reclining base 35 so as to sandwich the support wall 11b in cooperation therewith, and this auxiliary base 38 is also pivotably supported on the main shaft 23.

A drop-down spring 39 is provided in a compressed state on the auxiliary base 38 and the main shaft 23, the drop-down spring 39 urging the seat back 6 in a forward dropping-down direction via the auxiliary base 38. This drop-down spring 39 is formed from a mainspring disposed around the main shaft 23, the inner end thereof being retained by the main shaft 23 and the outer end thereof being retained by a latching claw 40 formed on the auxiliary base 38.

An upper outer peripheral face of the support wall 11b of the outer rear support member 11 is formed into an arc face with the main shaft 23 as its center, and a locking groove 33 is formed on the outer peripheral face. On the other hand, the auxiliary base 38 is secured to the reclining base 35 by means of two shafts, that is, the main shaft 23 and a support shaft 41 disposed above the main shaft 23 and extending through the reclining base 35 and the auxiliary base 38, and a locking lever 42 is swingably supported on the support shaft 41 between the reclining base 35 and the auxiliary base 38, the locking lever 42 being capable of engaging with and disengaging from the locking groove 33. This locking lever 42 locks the seat back 6 at the raised position C by engaging with the locking groove 33 when the seat back 6 is raised to the raised position C. This locking lever 42 integrally has a release arm 43 protruding from an upper face thereof.

Furthermore, pivotably supported on the reclining base 35 via a support shaft 46 and a support shaft 47 are a locking control lever 44 and a drive lever 45, which are disposed in sequence upward from the locking lever 42 side.

The locking control lever 44 is formed from a retaining arm 44a protruding toward the locking lever 42 side, a release cam 44b opposing the release arm 43, and a driven arm 44c protruding toward the drive lever 45 side, the retaining arm 44a being capable of pushing a rear face of the locking lever 42 engaged with the locking groove 33 and holding them in the engaged state, and the release cam 44b being capable of pushing and pivoting the release arm 43 so as to disengage the locking lever 42 from the locking groove 33. A driven pin 48 is projectingly provided on a side face of the driven arm 44c.

The drive lever 45 is formed from a lower arm 45a protruding beneath the support shaft 47 and an upper arm 45b protruding in front of the support shaft 47, and the lower arm 45a is provided with a bent elongated hole-shaped drive groove 49, with which the driven pin 48 engages. When the upper arm 45b pivots downwardly (see FIG. 11), this drive groove 49 pivots the locking control lever 44 in the locking direction for the locking lever 42 via the driven pin 48, and when the upper arm 45b pivots upwardly (see FIG. 12), it pivots the locking control lever 44 in the locking release direction for the locking lever 42 via the driven pin 48, and a locking spring 50 urging the upper arm 45b so as to pivot downwardly is provided between the upper arm 45b and the auxiliary base 38. This locking spring 50 is formed from a coil spring, one end thereof being connected to a connecting piece 51 of the auxiliary base 38 and the other end thereof being connected to a connecting hole 52 of the upper arm 45b. Also connected to the upper arm 45b is a release-operating wire 54 that is capable of pivoting the upper arm 45b upward against the urging force of the locking spring 50. This release-operating wire 54 is pulled out toward the rear face side of the seat back 6 by being guided by a guide tube 56 supported on an upper end part of the reclining base 35 via a wire support piece 55, and a strap 57 (FIG. 6) for the pulling operation is attached to the outer end of the release-operating wire 54.

Figure 11:
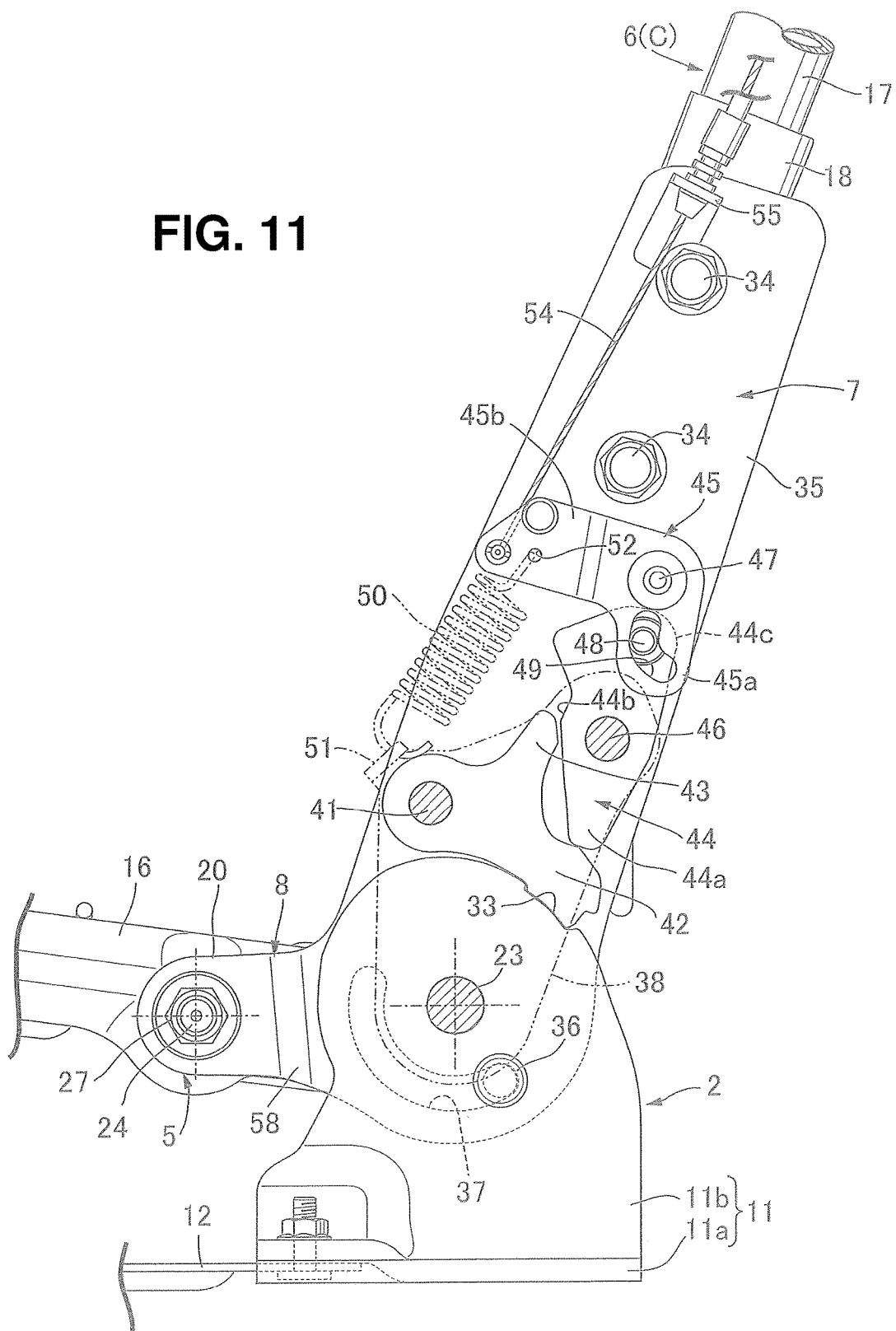
FIG. 11 is an enlarged view of a reclining mechanism part of FIG. 6.
Figure 12:
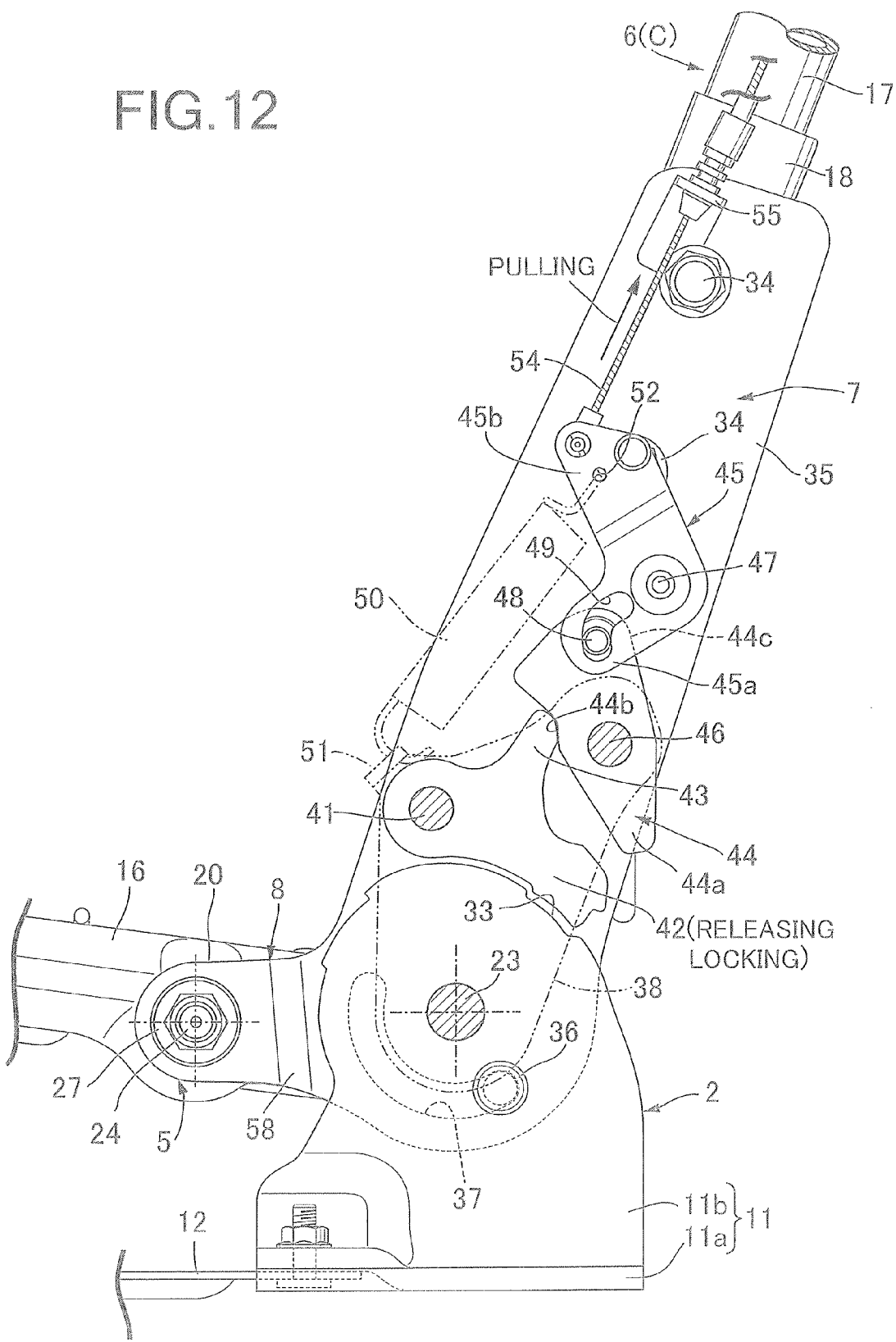
FIG. 12 is a diagram for explaining the operation of releasing locking of the reclining mechanism.

In a state in which the seat back 6 is raised to the in-use position A, as shown in FIG. 11, the upper arm 45b of the drive lever 45 is pivoted downwardly by virtue of the urging force of the locking spring 50, and the drive groove 49 pivots the locking control lever 44 in the locking direction for the locking lever 42 via the driven pin 48. That is, the retaining arm 44a of the locking control lever 44 pushes the rear face of the locking lever 42 and holds the locking lever 42 in a state in which it is engaged with the locking groove 33 of the rear support member 11, and this allows the seat back 6 to be locked at the in-use position A. As shown in FIG. 12, when the release-operating wire 54 is pulled via the strap 57, the upper arm 45b of the drive lever 45 pivots upwardly against the urging force of the locking spring 50, and the drive groove 49 pivots the locking control lever 44 in the release direction via the driven pin 48. That is, the locking lever 42 allows the retaining arm 44a to escape rearward from the rear face of the locking lever 42, and the release cam 44b pushes the release arm 43 of the locking lever 42, thus disengaging the locking lever 42 from the locking groove 33. As a result, the seat back 6 pivots forward by virtue of the urging force of the drop-down spring 39 and reaches the dropped-down position D, where it is superimposed on the upper face of the seat cushion 4. As described above, this dropped-down position D is restricted by the stopper pin 36 of the rear support member 11 abutting against the front inner end wall of the long hole 37 of the reclining base 35, and the back frame 17 and the rear face of the seat back 6 attain a substantially horizontal state.

When the seat back 6 is returned from the dropped-down position D to the raised position C, the seat back 6 is pulled to raise it against the urging force of the drop-down spring 39. Releasing the pulling of the release-operating wire 54 during this process enables the locking lever 42 to engage with the locking groove 33 by the operation of the urging force of the locking spring 50, thereby automatically holding the seat back 6 at the raised position C. As described above, this raised position C is restricted by the stopper pin 36 of the rear support member 11 abutting against the rear inner end wall of the long hole 37 of the reclining base 35.

Figure 3:
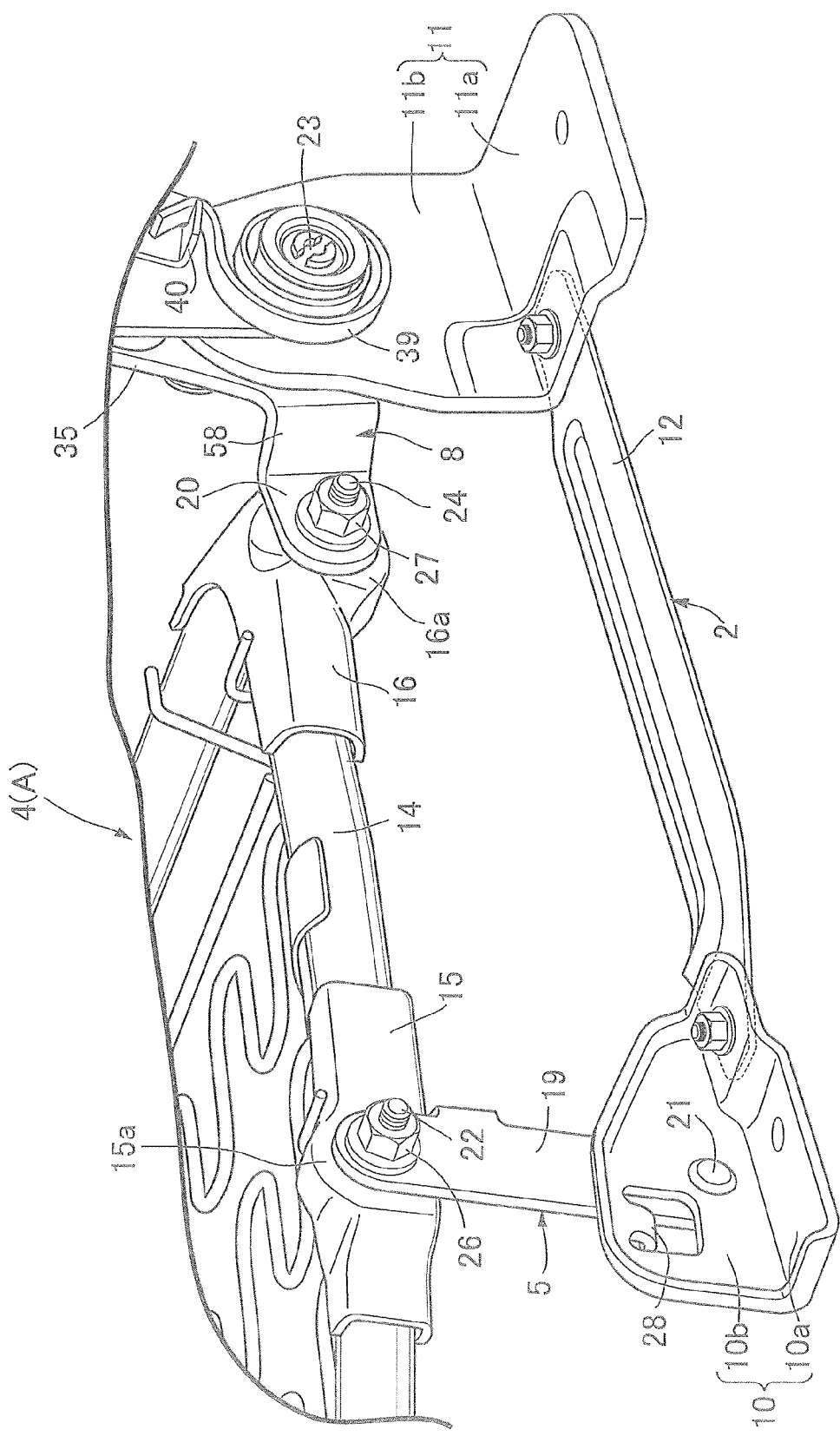
FIG. 3 is a perspective view of an outer seat support platform of the folding seat and its surrounding area when viewed from the outside.
Figure 4:
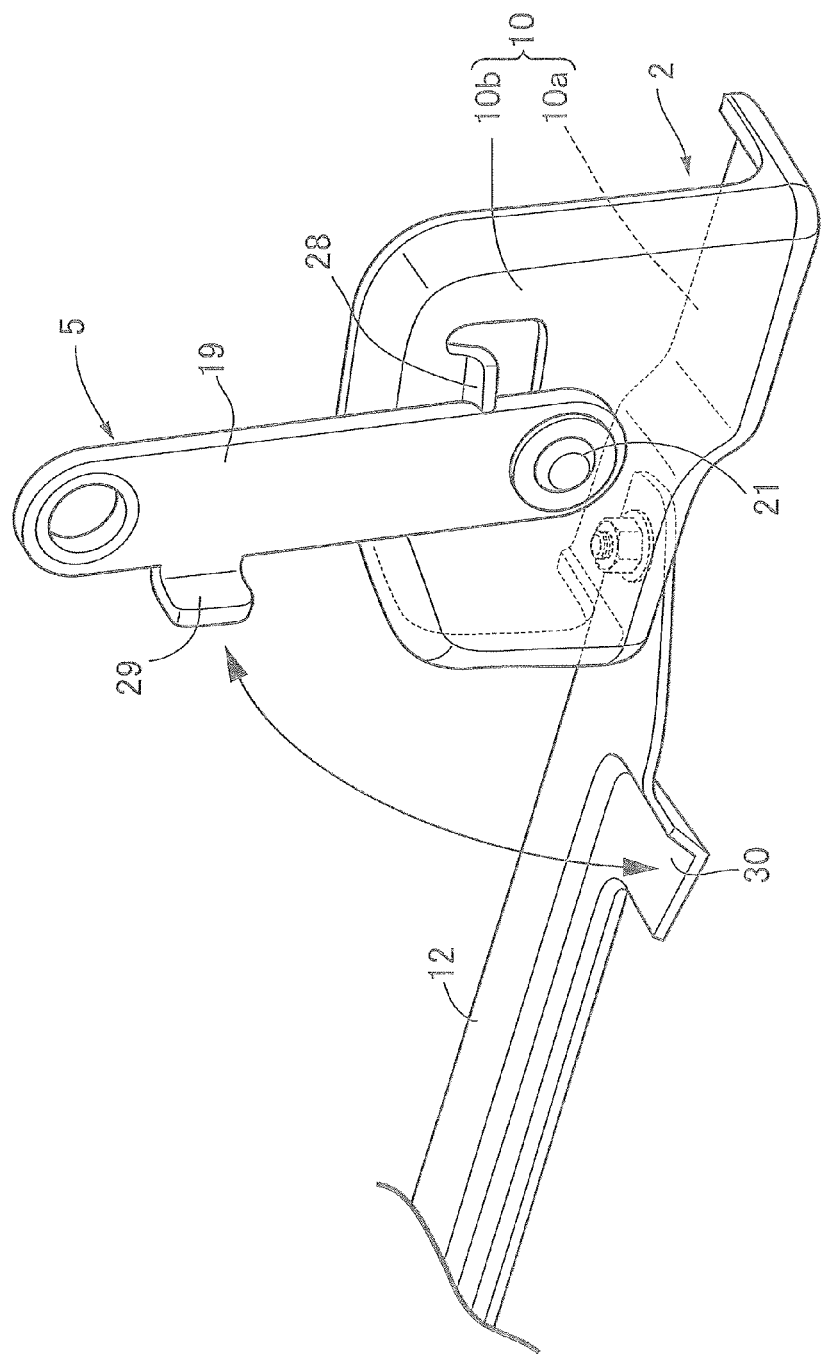
FIG. 4 is a perspective view of the outer seat support platform and a front swing arm when viewed from the inside.
Figure 5:
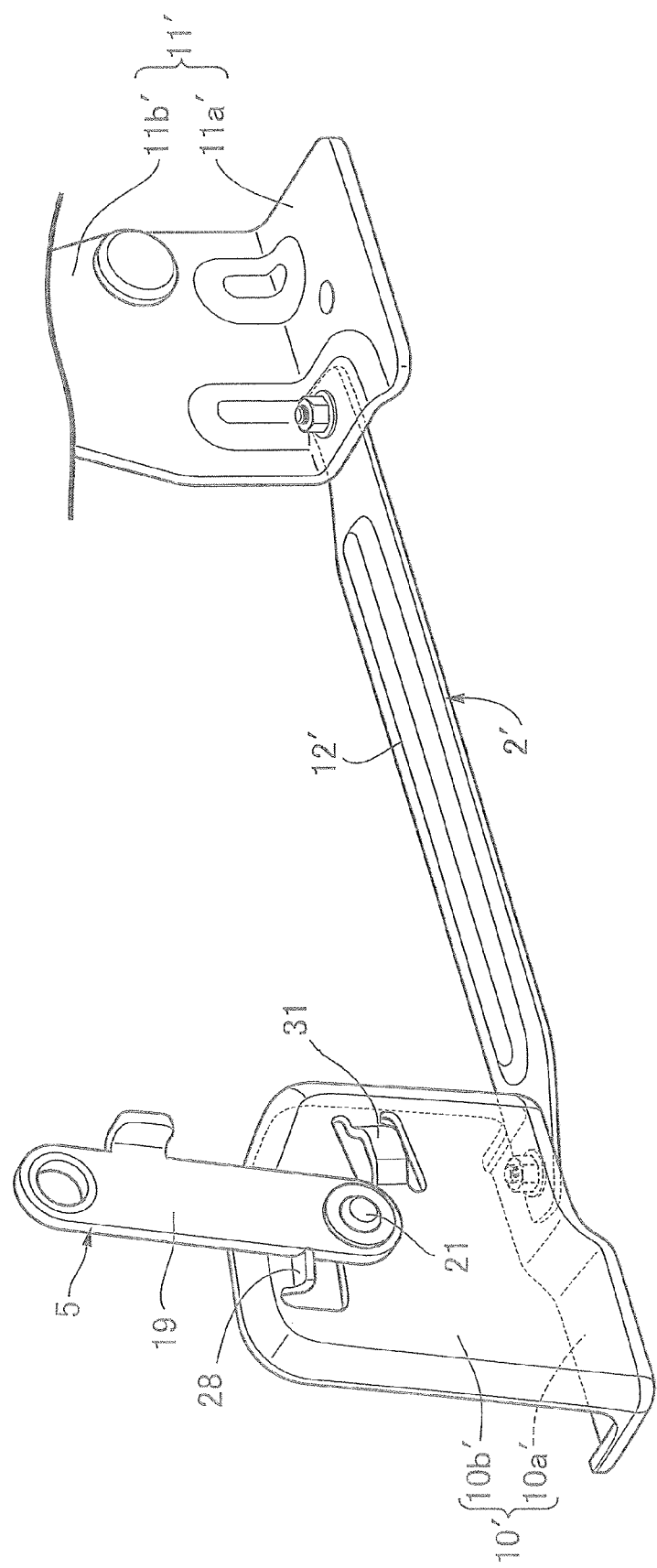
FIG. 5 is a perspective view of an inner seat support platform and the front swing arm when viewed from the inside.
Figure 9:
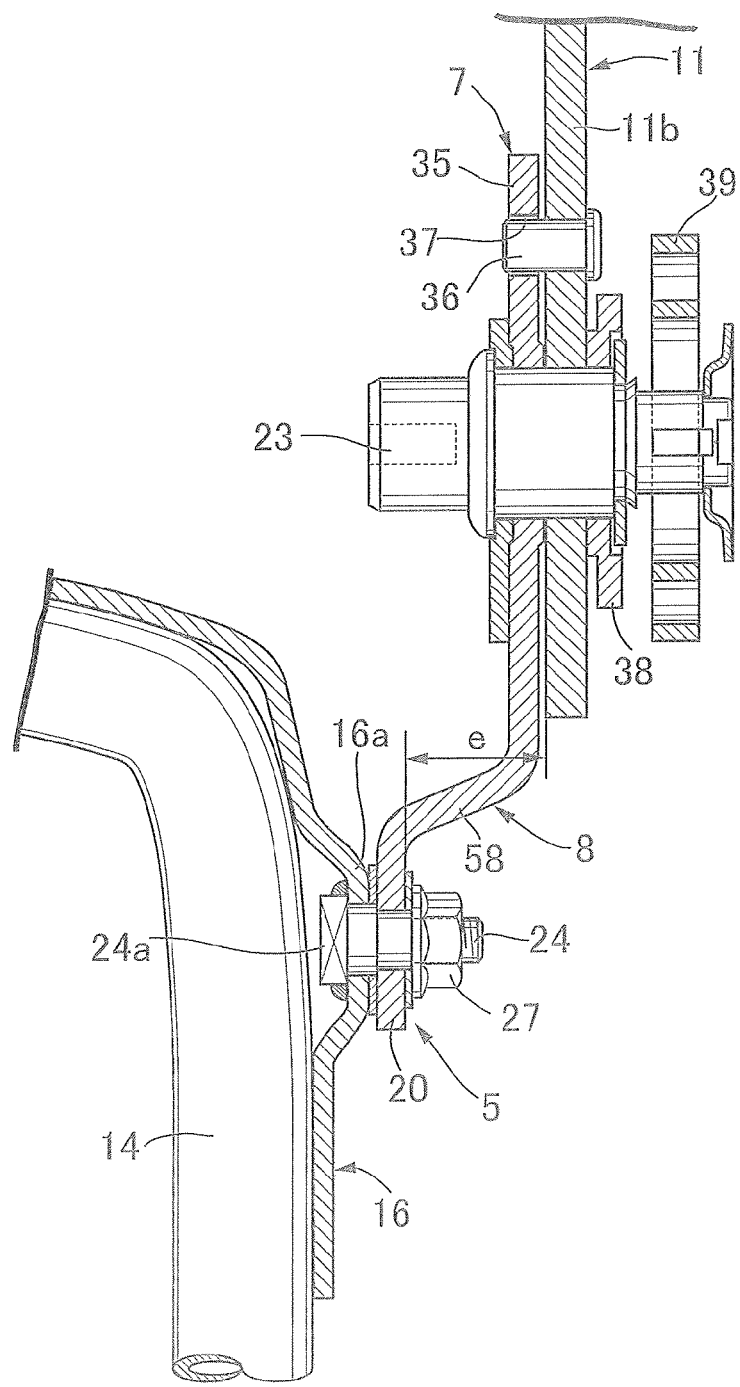
FIG. 9 is an enlarged sectional view along line 9-9 in FIG. 6.
Figure 10:
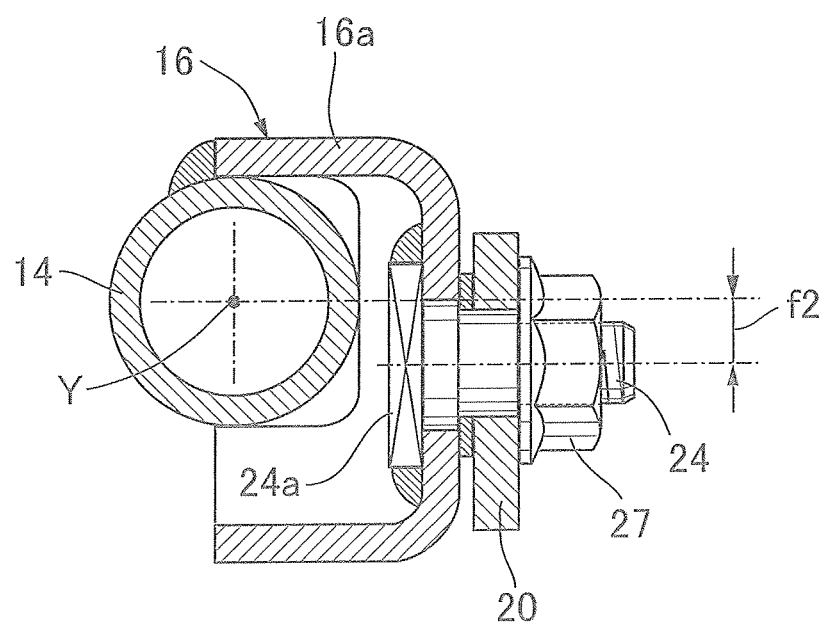
FIG. 10 is an enlarged sectional view along line 10-10 in FIG. 6.

In FIG. 3 and FIG. 9, the rear swing arms 20 and 20 on both inner and outer sides are disposed offset toward the inside by a predetermined distance e from the support walls 11b and 11b' of the rear support members 11 and 11' on opposite sides. The coupling mechanism 8 integrally provides a link between each rear swing arm 20 and each reclining base 35 superimposed on the inside face of the support wall 11b, 11b'. In this arrangement, the predetermined distance e is set so as to be larger than the amount by which the rear movable pivot 24 projects from the outer face of the rear swing arm 20.

Specifically, the coupling mechanism 8 is formed from a spacer piece 58 that bends inwardly from each reclining base 35 and extends by the predetermined distance e, and the rear swing arm 20 is formed by bending from the inner end of the spacer piece 58. The reclining base 35, the spacer piece 58, and the rear swing arm 20 are press formed from a single plate material. In addition, the reclining base 35, the spacer piece 58, and the rear swing arm 20 may be formed individually and then joined integrally by welding, etc. In either case, the main shaft 23 serves as a common pivot axis for the reclining base 35 and the rear swing arm 20.

When the reclining base 35 is raised together with the seat back 6, the coupling mechanism 8 makes the rear swing arm 20 jut out in front of the main shaft 23 in association therewith, and when the reclining base 35 drops down forward together with the seat back 6, it operates so as to pivot the rear swing arm 20 beneath the main shaft 23 in association therewith.

In the above arrangement, the brackets 15 and 16 welded to the cushion frame 14 are integrated with the cushion frame 14, thus substantially becoming parts of the cushion frame 14, and the brackets 18 and 65 welded to the back frame 17 are also integrated with the back frame 17, thus substantially becoming parts of the cushion frame 14.

The operation of the folding seat 1 is now explained.

Figure 6:
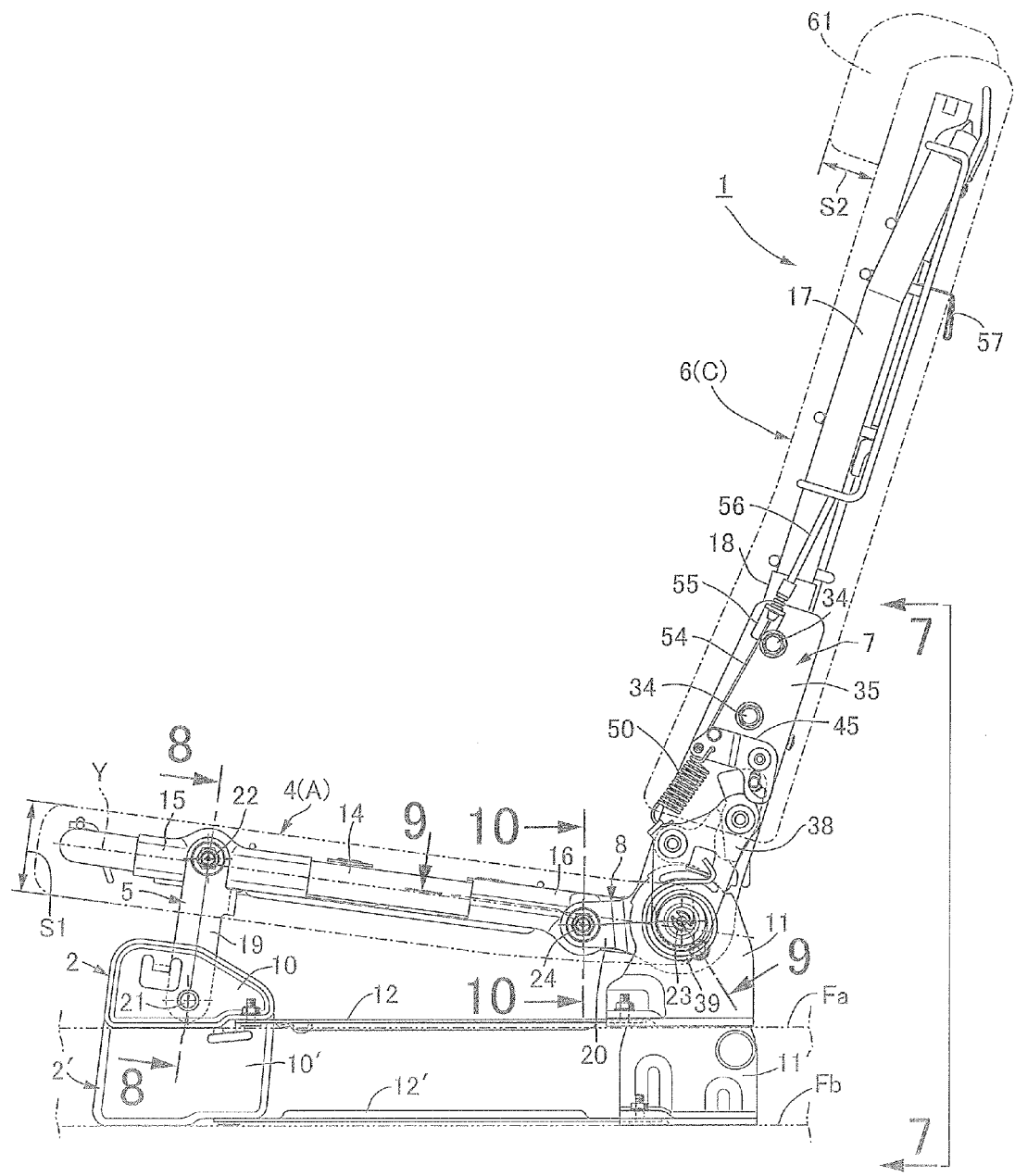
FIG. 6 is a view from arrow 6 in FIG. 2.

As shown in FIG. 11, when the seat back 6 is locked at the raised position C by the reclining mechanism 7, in the seat cushion storage mechanism 5 the rear swing arm 20, which is linked to the reclining base 35, takes an attitude of jutting out in front of the main shaft 23, and the front swing arm 19 takes an attitude of rising in a substantially vertical direction, thereby holding the seat cushion 4 at the in-use position A, as shown in FIG. 6, which is higher than the elevated surface Fa of the floor F and in which the upper face is inclined upward toward the front. Therefore, an occupant can be stably seated on the seat 1 as usual.

When the seat cushion 4 is at the in-use position A as above, the front swing arm 19 of the cushion storage mechanism 5 abuts against the first movement restricting means 28, that is, the stopper part 28 of the front support member 10, 10' to thus restrict the limit of forward pivoting; when a large forward load acts on the seat 1 in the in-use state, this load is supported by being dispersed among the reclining mechanism 7 in the locked state and the first movement restricting means 28 of the cushion storage mechanism 5. It is therefore possible to reliably hold the seat 1 in the in-use state while reducing the load burden on the reclining mechanism 7 and avoiding any increase in its size.

Subsequently, the locked state of the reclining mechanism 7 is released, the seat back 6 is dropped down forward toward the dropped-down position D by means of the urging force of the drop-down spring 39 (see FIG. 14), at the same time the reclining base 35 is also dropped down forward, in association therewith while pivoting beneath the main shaft 23 the rear swing arm 20 of the seat cushion storage mechanism 5 pulls the rear end part of the cushion frame 14 downward and rearward via the rear movable pivot 24, accompanying this the front swing arm 19 pivots rearward from a substantially vertical raised attitude around the fixed pivot 21, this makes the entire seat cushion 4 move as shown in FIG. 13 rearward and downward, that is, toward the storage position, and the storage position B is restricted by the front swing arm 19 abutting against the stopper 30, 31 of each of the inner and outer seat support platforms 2 and 2'.

Since the effective length of the rear swing arm 20 pivoting from the substantially vertical raised attitude toward the rearwardly collapsed attitude is shorter than the effective length of the front swing arm 19 pivoting from the forwardly jutting-out attitude toward the hanging-down attitude, the front movable pivot 22 moves rearward and downward to a great extent, whereas the amount of downward movement of the rear movable pivot 24 is smaller than that of the front movable pivot 22, and the amount of rearward movement thereof is substantially equal to that of the front movable pivot 22. As a result, the cushion frame 14, which is inclined upward toward the front when the seat cushion 4 is at the in-use position A, attains a substantially horizontal state at the storage position B.

Moreover, when the seat cushion 4 is at the in-use position A, the center of the front movable pivot 22 occupies a position offset by the fixed distance f1 upward relative to the central axis Y of the side part of the cushion frame 14, whereas the center of the rear movable pivot 24 occupies a position offset by the fixed distance f2 downward relative to the central axis Y of the side part of the cushion frame 14. The effective length of the front swing arm 19 therefore increases by an amount corresponding to the upward offset of the center of the front movable pivot 22 relative to the central axis Y of the side part of the cushion frame 14, the limit of rearward movement of the rear movable pivot 24 is shifted rearward when the seat cushion 4 goes toward the storage position B by an amount corresponding to the downward offset of the center of the rear movable pivot 24 relative to the central axis Y of the side part of the cushion frame 14, and it is thereby possible to shift the storage position B of the seat cushion 4 further downward and rearward.

As described above, with regard to the seat cushion 4, its bottom portion 4a is housed within the recess Fr of the floor F. In other words, with regard to the seat cushion 4, its bottom portion 4a is held at a position close to the low surface Fb, which is lower than the elevated surface Fa of the floor F, thus improving the storage properties of the seat cushion 4.

On the other hand, the seat back 6 reaches the dropped-down position D at the same time as the seat cushion 4 reaches the storage position B, and the dropped-down position D is restricted by the stopper pin 36 of the rear support member 11 abutting against the front inner end wall of the long hole 37 of the reclining base 35.

Since the seat back 6 at the dropped-down position D is superimposed on the seat cushion 4 at the storage position B while keeping the back frame 17 substantially horizontal, and the seat cushion 4 puts the cushion frame 14 in a substantially horizontal state as described above, both of the frames 14 and 17 are substantially in parallel and the closest to each other, and this enables the entire seat 1 to be folded compactly while eliminating any wasted space between the seat cushion 4 and the seat back 6. Moreover, the rear face of the seat back 6 can be utilized effectively as a substantially horizontal baggage load face, thus improving the loading performance for baggage.

Furthermore, since the lateral widths W1 and W2 of the cushion frame 14 and the back frame 17 are set substantially equal to each other, when the seat 1 is in the folded state, by superimposing left and right side parts of the cushion frame 14 and opposite side parts of the back frame 17 when viewed from above, not only is it possible to fold the seat 1 more compactly, but it is also possible to reliably support by means of the two frames 14 and 17 the weight of baggage loaded on the rear face of the seat back 6.

Moreover, when the seat 1 is in such a folded state, since the bottom portion 4a of the seat cushion 4 is held at a position lower than the elevated surface Fa of the floor F, and the dropped-down seat back 6 is superimposed on the seat cushion 4, even if baggage is placed on the rear face of the seat back 6, the center of gravity of the entire seat 1 including the baggage can be made lower than that of the conventional arrangement, thus contributing to a lowering of the center of gravity of the automobile and also contributing to an increase of the load capacity on the seat back 6.

In this arrangement, the seat cushion 4 is arranged so that at least a portion of the cushion frame 14, which is the heaviest among the parts of the seat cushion 4, is present at a position lower than the elevated surface Fa, and this is effective in lowering of the center of gravity of the automobile.

Furthermore, the seat 1 in the folded state is moved to the rear of the position prior to folding by the operation of the cushion storage mechanism 5, and in this state it is disposed within the width in the fore-and-aft direction of the rear wheel house H. It is therefore possible to utilize effectively spaces, in front of and to the rear of the rear wheel house H, of the floor F when the seat 1 is in the folded state.

Moreover, since the reclining mechanism 7 is provided on the outer face, opposing the rear wheel house H, of the seat back 6, it is possible to install the reclining mechanism 7 by utilizing effectively dead space between the seat back 6 and the rear wheel house H.

When the seat cushion 4 is at the storage position B, due to the operation of the second movement restricting means, that is, the stopper part 29 of the front swing arm 19 abutting against the inward stopper 30 of the linking member 12 of the outer seat support platform 2 and the lower edge part of the front swing arm 19 abutting against the stopper part 31 of the front support member 10' of the inner seat support platform 2', the center of the front movable pivot 22 is positioned above the straight line L, which joins the centers of the fixed pivot 21 and the rear movable pivot 24, so that it is not lower than the straight line L. Therefore, when the seat back 6 is pivoted from the dropped-down position D toward the raised position C, the seat cushion 4, which moves forward in response to forward pivoting of the rear swing arm 20 of the cushion storage mechanism 5 from the downward position, reliably pushes up the front swing arm 19 forward via the front movable pivot 22, thus enabling the seat cushion 4 to return to the in-use position A.

On the other hand, when the seat back 6 reaches the predetermined raised position C, the locking lever 42 is engaged with the locking groove 33 of the rear support member 11 by operation of the locking spring 50 of the reclining mechanism 7, thus holding the seat back 6 at the raised position C.

Furthermore, the rear swing arm 20 is disposed so as to be offset by the predetermined distance e further inward than the inside face of the support wall 11b of the rear support member 11, which supports the rear movable pivot 24, the predetermined distance e is set so as to be larger than the amount by which the rear movable pivot 24 projects from the outer face of the rear swing arm 20, and the coupling mechanism 8 provides an integral link between the rear swing arm 20 and the reclining base 35. The coupling mechanism 8 therefore serves as a spacer between the rear swing arm 20 and the reclining base 35, and when the rear swing arm 20 of the cushion storage mechanism 5 pivots downward in order to move the seat cushion 4 to the storage position B, it is possible to avoid rubbing and interference of the support wall 11b, 11'b of the rear support member 11, 11' not only with the rear swing arm 20 but also with the rear movable pivot 24, which protrudes from the outer face thereof, the nut 27 screwed therearound, etc., thereby enabling the seat 1 to be folded smoothly and also enabling it to smoothly return to the in-use state.

Furthermore, the coupling mechanism 8 is formed from the spacer piece 58, which bends inwardly from the reclining base 35, the rear swing arm 20 is formed so as to bend from the inner end of the spacer piece 58, the reclining base 35, the spacer piece 58, and the rear swing arm 20 are press-formed from a single plate material, and this is therefore effective in reducing the number of components and making the structure simple and compact.

Referring again to FIG. 1, FIG. 2, and FIG. 13, a pair of left and right headrest guide tubes 60 and 60, which extend in the vertical direction, are fixedly provided on an upper part of the back frame 17, and a pair of left and right support rods 61a and 61a of the headrest 61 are detachably fitted into the headrest guide tubes 60 and 60 so that the vertical position is adjustable. The headrest 61 is formed into a teardrop shape in which it protrudes while curving from the upper end face along the front face of the seat back 6 and its rear face is set back further than the rear face of the seat back 6, and it is disposed so that it is in front of the seat cushion 4 when the seat 1 is folded, that is, the seat back 6 is at the dropped-down position D. Therefore, the lower face of the headrest 61 is positioned lower than the upper face of the seat cushion 4, thus preventing interference between the headrest 61 and the seat cushion 4 and lowering the center of gravity of the entire seat 1. In particular, since the vertical position of the headrest 61 is adjustable relative to the seat back 6, even if the height of the seat back 6 is shorter than the length in the fore-and-aft direction of the seat cushion 4, by adjusting the position of the headrest 61 by moving upward, when the seat back 6 is dropped down the headrest 61 is placed in front of the seat cushion 4, thus avoiding interference with the seat cushion 4.

Furthermore, the amount S2 of protrusion of the headrest 61 from the front face of the seat back 6 is set so as to be smaller than the thickness S1 of the front end part of the seat cushion 4. Therefore, when the seat 1 is folded, even if the bottom portion 4a of the seat cushion 4 sinks within the recess Fr of the floor F, it is possible to prevent interference of the headrest 61 with the normal face Fc of the floor F in front of the recess Fr.

On the other hand, a cutout part 62 is formed in an upper end part of the seat back 6, the cutout part 62 receiving an upper end part of the headrest 61 when it is adjusted to the lowest adjustment position. Therefore, when the headrest 61 is at the lowest position, the upper face of the headrest 61 is flush with the upper face of the seat back 6, and it is therefore possible to avoid interference between the headrest 61 and another object positioned in front thereof when the seat back 6 is dropped down.

Figure 15:
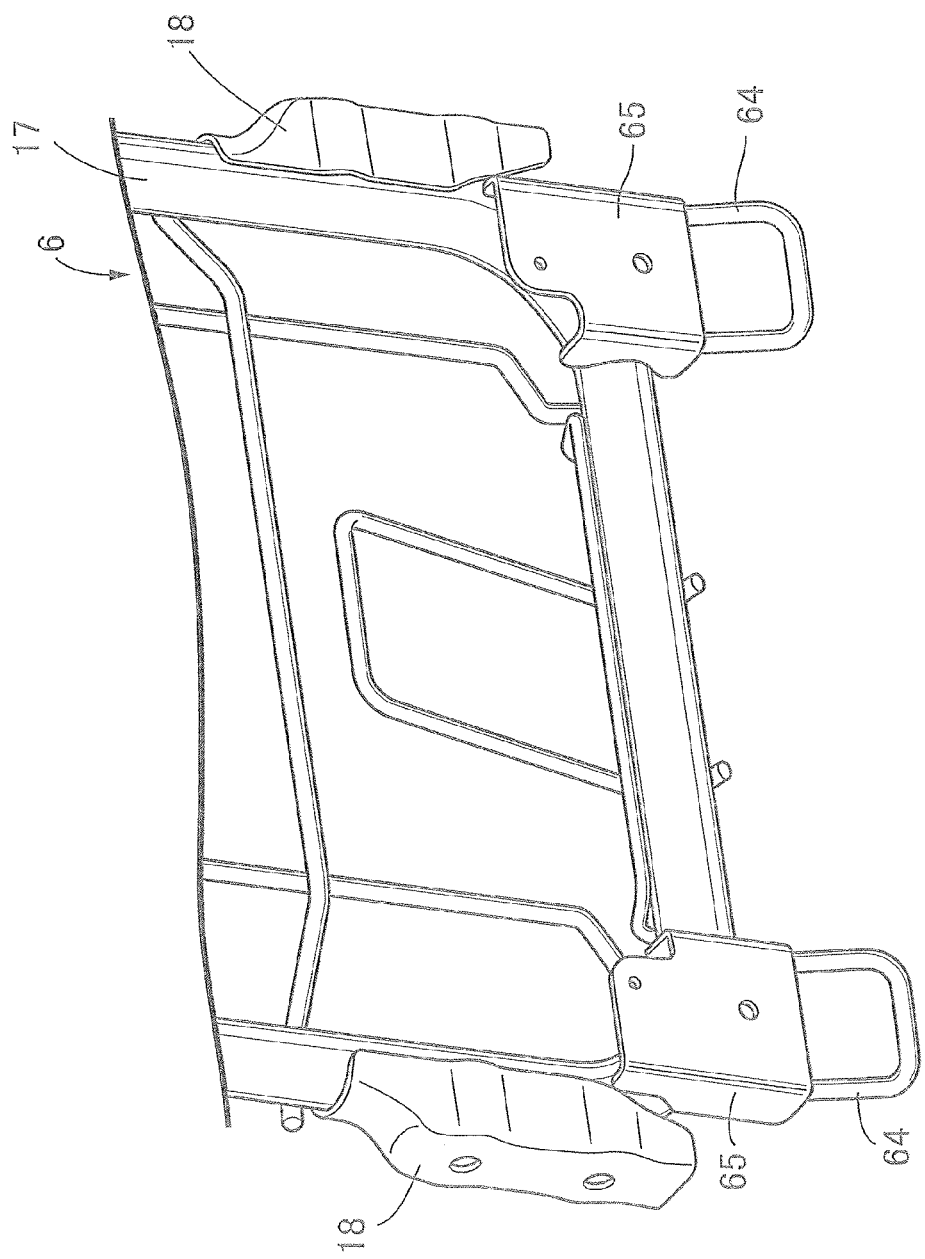
FIG. 15 is a perspective view of a lower part of a back frame showing a mounting ring for a child seat.

In FIG. 2 and FIG. 15, brackets 65 are welded to four corners of the back frame 17 so as to reinforce the corresponding corners, a mounting ring 64 for a child seat being welded to the bracket 65. By so doing, it is possible to enhance the support rigidity for the mounting ring 64 for a child seat.

Figure 16:
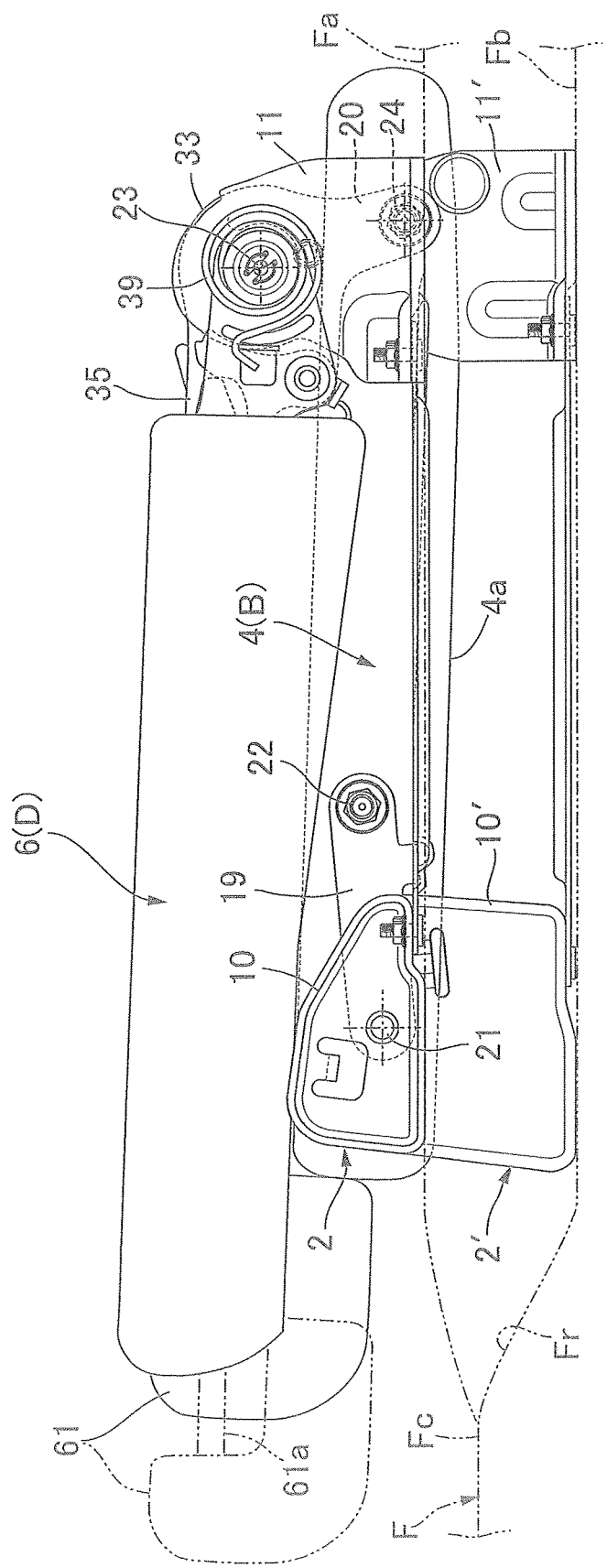
FIG. 16 is a side view showing a folded state of a seat of another embodiment of the present invention.

FIG. 16 shows another embodiment of the present invention. In this embodiment, when a seat back 6 is dropped down, adjusting the position of a headrest 61, whose vertical position is adjustable, enables a seat cushion 4 and the headrest 61 to have their opposing faces in the fore-and-aft direction contacting each other. Therefore, when a seat 1 is folded, the headrest 61 is the closest to the front end of the seat cushion 4, and it is possible to avoid interference between the headrest 61 and a front seat, which is not illustrated. The arrangement is otherwise the same as that of the above embodiment; in FIG. 16 parts corresponding to those of the above embodiment are denoted by the same reference numerals and symbols, and duplication of the explanation is omitted.

Figure 17:
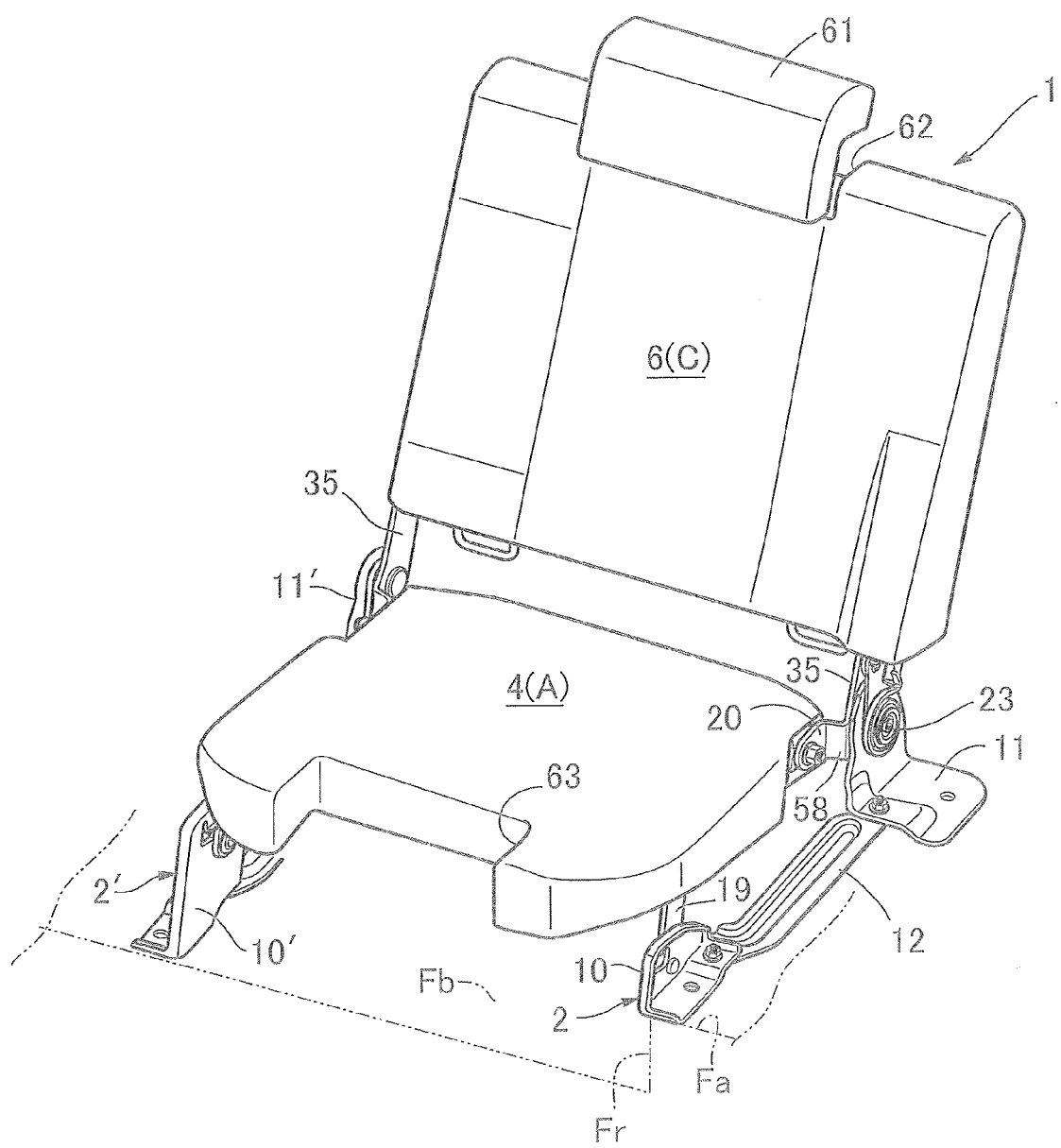
FIG. 17 is a perspective view showing a folding seat of yet another embodiment of the present invention.

FIG. 17 shows yet another embodiment of the present invention. In this embodiment, a cutout recess 63 is provided at the front end of a seat cushion 4, the recess 63 being capable of housing a headrest 61 when a seat back 6 is dropped down. In accordance with such an arrangement, even when a sufficient height of the seat back 6 cannot be ensured and, moreover, the headrest 61 is adjusted at a high position, when the seat back 6 is dropped down, the headrest 61 can be housed in the recess 63 without interfering with the seat cushion 4, and even interference between the headrest 61 and a front seat can easily be avoided.

Moreover, since the headrest 61 can be removed from the seat back 6, if this is removed from the seat back 6, even when the gap between the seat cushion 4 and the front seat 1 is small it is possible to avoid interference of the headrest 61 with the seat cushion 4 by removing the headrest 61. Furthermore, in the folded state of the seat 1 with the headrest 61 removed, the seat 1 can easily be placed within the width in the fore-and-aft direction of a rear wheel house H, and a space on a floor F in front of the rear wheel house H can therefore be used more effectively. The arrangement is otherwise the same as that of the above embodiment; in FIG. 16 parts corresponding to those of the above embodiment are denoted by the same reference numerals and symbols, and duplication of the explanation is omitted.

Figure 18:
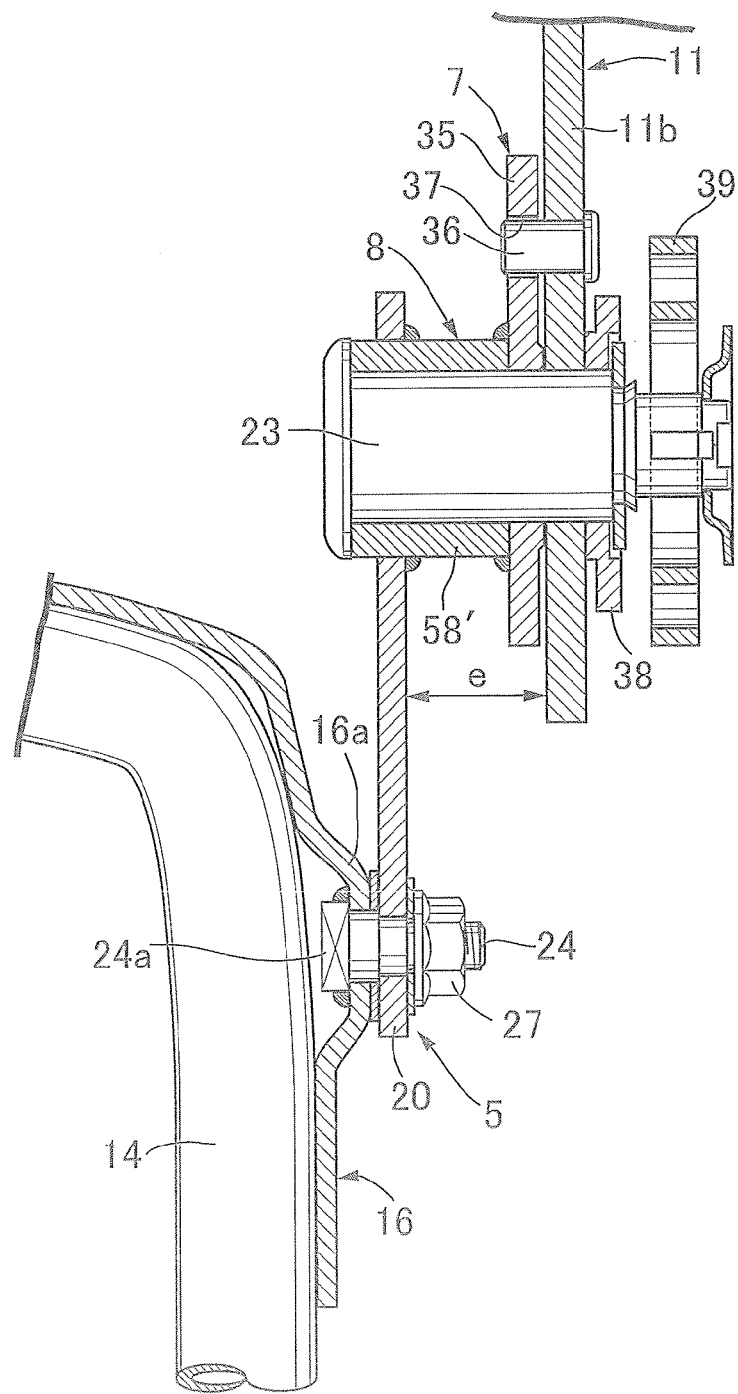
FIG. 18 is a view, corresponding to FIG. 9, of still another embodiment of the present invention.

FIG. 18 shows yet another embodiment of the present invention. In this embodiment, a coupling mechanism 8 is formed from a spacer collar 58' rotatably fitted and supported on a main shaft 23, and a reclining base 35 and a rear swing arm 20 are welded to opposite ends of the spacer collar 58'. The arrangement is otherwise the same as that of the above embodiment; in FIG. 18 parts corresponding to those of the above embodiment are denoted by the same reference numerals and symbols, and duplication of the explanation is omitted.

The spacer collar 58' thus offsets the rear swing arm 20 by a predetermined distance e further inward than an inside face of a support wall 11b of a rear support member 11 and is linked integrally to the reclining base 35, and in the same manner as in the embodiment above it is possible to prevent rubbing and interference between the rear swing arm 20, a rear movable pivot 24, a nut 27, etc. and a support wall 11b, 11'b of a rear support member 11, 11'.

The present invention is not limited to the embodiments above, and may be modified in a variety of ways as long as the modifications do not depart from the spirit and scope thereof. For example, the seat cushions 4 and 4 of the left and right seats 1 and 1 may be united, and may be supported by a pair of seat support platforms 2 and 2 mounted on left and right elevated surfaces Fa and Fa. In the illustrated example, pipe materials forming the cushion frame 14 and the back frame 17 have an identical diameter, but they may have different diameters.

The invention claimed is:

1. An automotive folding seat device comprising:
a first seat support platform that is mounted on a floor of an automobile body, the first seat support platform comprising at least one short support member comprising a first base wall fixed to the floor and a short support wall integrally formed with the first base wall and rising upwardly therefrom, the short support wall having a first height;
a second seat support platform that is mounted on the floor of the automobile body, the second seat support platform comprising at least one tall support member comprising a second base wall fixed to the floor and a tall support wall integrally formed with the second base wall and rising upwardly therefrom, where the tall support wall has a second height which is taller than the first height of the short support wall;
a seat cushion that is operatively supported on the first and second seat support platforms;
a cushion storage mechanism that is provided between each of the first and second seat support platforms and the seat cushion and is capable of moving the seat cushion from an in-use position to a storage position which is lower than the in-use position;
a seat back that is operatively supported on the first and second seat support platforms so as to be pivotable between a raised position at which the seat back rises above the seat cushion and a dropped-down position at which the seat back is superimposed on the seat cushion;
a reclining mechanism that is provided between one of the first and second seat support platforms and the seat back and is capable of selectively holding the seat back at either the raised position or the dropped-down position; and
a coupling mechanism that provides a link between the reclining mechanism and the cushion storage mechanism so as to move the seat cushion from the in-use position to the storage position in association with pivoting of the seat back from the raised position to the dropped-down position,
wherein:
the floor has formed thereon a wheel house, an elevated surface and a low surface which is lower than the elevated surface, wherein the elevated surface is separate and distinct from the wheel house,
the first seat support platform is mounted on the elevated surface,
the second seat support platform is mounted on the low surface,
the seat cushion is disposed higher than the low surface,
the cushion storage mechanism is arranged so as to be capable of moving the seat cushion from the in-use position, which is higher than the elevated surface, to the storage position, which is closer to the low surface than the in-use position, and
the first and second seat support platforms are distanced from each other in a widthwise direction of the seat cushion and the seat back.

2. The automotive folding seat device according to claim 1, further comprising a cushion frame which is operatively connected to the first and second seat support platforms and provided for supporting the seat cushion thereon, wherein the seat cushion is arranged such that at the storage position at least part of the cushion frame is present at a position lower than the elevated surface.

3. The automotive folding seat device according to claim 1, wherein a headrest mounted on an upper part of the seat back is arranged so as to protrude from an upper end face of the seat back while bending along a front face thereof, and is disposed so as to be present in front of the seat cushion when the seat back is at the dropped-down position.

4. The automotive folding seat device according to claim 3, wherein the headrest is vertically adjustably mounted on the seat back, and is disposed so as to be present in front of the seat cushion when the seat back is collapsed to the dropped-down position at least at an upward-adjusted position of the headrest.

5. The automotive folding seat device according to claim 3, wherein
the amount of protrusion of the headrest from the front face of the seat back is set so as to be smaller than a thickness of a front end part of the seat cushion.

6. The automotive folding seat device according to claim 1, wherein a recess is provided at the front end of the seat cushion, the recess being capable of housing the headrest when the seat back is dropped down.

7. The automotive folding seat device according to claim 3, wherein when the seat back is at the dropped-down position, the seat cushion and the headrest are disposed so that opposing faces thereof in a fore-and-aft direction are in contact with each other.

8. The automotive folding seat device according to claim 1, wherein the seat cushion at the storage position and the seat back at the dropped-down position are disposed within a width, in a fore-and-aft direction, of rear wheel houses formed in the automobile body so as to rise up from laterally opposite ends of the floor.

9. The automotive folding seat device according to claim 8, wherein the headrest is detachably mounted on the seat back, and in a state in which the headrest is detached, the seat cushion at the storage position and the seat back at the dropped-down position are disposed within the width, in the fore-and-aft direction, of the rear wheel houses formed in the automobile body so as to rise from laterally opposite ends of the floor.

10. The automotive folding seat device according to claim 8, wherein the reclining mechanism is provided on an outer face, opposing the rear wheel house, of the seat back.

11. An automotive folding seat device comprising:
a first seat support platform that is mounted on a floor of an automobile body, the first seat support platform comprising at least one short support member comprising a first base wall fixed to the floor and a short support wall integrally formed with the first base wall and rising upwardly therefrom, the short support wall having a first height;
a second seat support platform that is mounted on the floor of the automobile body, the second seat support platform comprising at least one tall support member comprising a second base wall fixed to the floor and a tall support wall integrally formed with the second base wall and rising upwardly therefrom, where the tall support wall has a second height which is taller than the short support wall;
a seat cushion that is supported on the first and second seat support platforms;
a cushion storage mechanism that is provided between each of the first and second seat support platforms and the seat cushion and is capable of moving the seat cushion from an in-use position to a storage position, which is lower than and to the rear of the in-use position;
a seat back that is supported on the first and second seat support platforms so as to be pivotable between a raised position at which the seat back rises above the seat cushion and a dropped-down position at which the seat back is superimposed on the seat cushion;
a reclining mechanism that is provided between one of the first and second seat support platforms and the seat back and is capable of selectively holding the seat back at the raised position and the dropped-down position; and
a coupling mechanism that provides a link between the reclining mechanism and the cushion storage mechanism so as to move the seat cushion from the in-use position to the storage position in association with pivoting of the seat back from the raised position to the dropped-down position,
wherein the cushion storage mechanism is provided with first movement restricting means, the first movement restricting means configured and arranged to limit movement of the seat cushion at the in-use position when the seat cushion is moved from the storage position to the in-use position,
the first and second seat support platforms are distanced from each other in a widthwise direction of the seat cushion and the seat back, and
wherein the floor comprises a wheel house, an elevated surface and a low surface wherein the elevated surface is separate and distinct from the wheel house, and the first seat platform is mounted on the elevated surface of the floor which is higher than the low surface of the floor on which the second seat platform is mounted.

12. The automotive folding seat device according to claim 11, wherein the cushion storage mechanism comprises:
a front swing arm having one end linked to one of the first and second seat support platforms via a first pivot and the other end linked to a front end part of a frame of the seat cushion via a second pivot,
and a rear swing arm having one end linked to the one seat support platform via a third pivot and the other end linked to a rear end part of the frame via a fourth pivot,
wherein pivoting the front swing arm from a raised attitude to a rearwardly collapsed attitude and pivoting the rear swing arm from a forwardly jutting-out attitude to a hanging-down attitude allows the seat cushion to move from the in-use position to the storage position, and the first movement restricting means is provided between the front swing arm and the one seat support platform so as to prevent the front swing arm from pivoting forward from a predetermined raised attitude.

13. The automotive folding one seat device according to claim 12, wherein the seat support platform comprises a front support member, said front support member supporting the first pivot, and the first movement restricting means is formed from a stopper part that is formed on the short support wall and prevents the front swing arm from pivoting forward from the predetermined raised attitude by receiving the front swing arm.

14. The automotive folding seat device according to claim 12, wherein the cushion storage mechanism is provided with second movement restricting means that stops a center of the second pivot above a straight line at the storage position when the second pivot is moved from above to the straight line accompanying movement of the seat cushion from the in-use position to the storage position, the straight line joining centers of the first pivot and the fourth pivot.

15. The automotive folding seat device according to claim 14, wherein one seat support platform is formed from a front support member as one short support member that supports the first pivot, a rear support member that supports the third pivot, and a linking member that provides a link between these front and rear support members, and the second movement restricting means is formed on each of the linking member and the front swing arm from a pair of stopper parts that abut against each other to thus prevent the front swing arm from pivoting downward from a predetermined collapsed attitude.

16. The automotive folding seat device according to claim 14, wherein the other of the first and second seat support platforms comprises a front support member supporting the first pivot, and the second movement restricting means is formed on the support wall from a stopper part that prevents the front swing arm from pivoting downward from a predetermined collapsed attitude by receiving the front swing arm.

17. The automotive folding seat device according to claim 12, wherein front and rear brackets extending in the fore-and-aft direction are welded to a front part and a rear part of an outer face of the frame of the seat cushion respectively, and the second and fourth pivots are secured to the front and rear brackets respectively.

18. The automotive folding seat device according to claim 17, wherein outwardly bulging portions are formed on the front and rear brackets respectively, the second pivot is formed from a bolt that has a head portion thereof secured to an inner wall of the outwardly bulging portion of the front bracket by means of welding or swaging and protrudes outward of the outwardly bulging portion, and the fourth pivot is formed from a bolt that has a head portion welded to an inner wall of the outwardly bulging portion of the rear bracket and protrudes outward of the outwardly bulging portion.

19. An automotive folding seat device comprising:
a first seat support platform that is mounted on a floor of an automobile body, the first seat support platform comprising at least one short support member comprising a first base wall fixed to the floor and a short support wall integrally formed with the first base wall and rising upwardly therefrom, the short support wall having a first height;
a second seat support platform that is mounted on the floor of the automobile body, the second seat support platform comprising at least one tall support member comprising a second base wall fixed to the floor and a tall support wall integrally formed with the second base wall and rising upwardly therefrom, where the tall support wall has a second height which is taller than the first height of the short support wall;

a seat cushion;
a cushion storage mechanism that is capable of moving the seat cushion from an in-use position to a storage position, which is lower than and to the rear of the in-use position;
a seat back;
a reclining mechanism that enables the seat back to pivot between a raised position at which the seat back rises above the seat cushion and a dropped-down position at which the seat back is superimposed on the seat cushion; and
a coupling mechanism that provides a link between the reclining mechanism and the cushion storage mechanism so as to move the seat cushion from the in-use position to the storage position in association with pivoting of the seat back from the raised position to the dropped-down position,
the cushion storage mechanism comprising a front swing arm having one end linked to one of the first and second seat support platforms via a first pivot and the other end linked to a side face of a front end part of a cushion frame of the seat cushion via a second pivot and a rear swing arm having one end linked to the one seat support platform via a third pivot and the other end linked to a side face of a rear end part of the cushion frame via a fourth pivot, pivoting the front swing arm from a raised attitude to a rearwardly collapsed attitude and pivoting the rear swing arm from a forwardly jutting-out attitude to a hanging-down attitude allowing the seat cushion to move from the in-use position to the storage position,
and the reclining mechanism comprising a reclining base that is fixedly provided on a side face of a back frame of the seat back and is supported by the third pivot and locking means that is provided on the reclining base and is capable of preventing the seat back at the raised position from pivoting toward the dropped-down position,
wherein:
the rear swing arm is disposed offset by a fixed distance inward from an inside face of one seat support platform supporting the third pivot,
the rear swing arm and the reclining base are linked integrally via the coupling mechanism,
the first and second seat support platforms are distanced from each other in a widthwise direction of the seat cushion and the seat back, and
wherein the floor comprises a wheel house, an elevated surface and a low surface wherein the elevated surface is separate and distinct from the wheel house, and the first seat platform is mounted on the elevated surface of the floor which is higher than the low surface of the floor on which the second seat platform is mounted.

20. The automotive folding seat device according to claim 19, wherein the predetermined distance is set larger than an amount of protrusion of the fourth pivot projecting from an outer face of the rear swing arm.

21. The automotive folding seat device according to claim 19, wherein the coupling mechanism is formed from a lateral spacer integrally linking the rear swing arm and the reclining base.

22. The automotive folding seat device according to claim 21, wherein the spacer is formed from a spacer piece that bends inwardly from the reclining base, the rear swing arm is formed so as to bend from the inner end of the spacer piece, and the reclining base, the spacer piece, and the rear swing arm are press-formed from a single plate material.

23. An automotive folding seat device comprising:
a first seat support platform that is mounted on a floor of an automobile body, the first seat support platform comprising at least one short support member comprising a first base wall fixed to the floor and a short support wall integrally formed with the first base wall and rising upwardly therefrom, the short support wall having a first height;
a second seat support platform that is mounted on the floor of the automobile body, the second seat support platform comprising at least one tall support member comprising a second base wall fixed to the floor and a tall support wall integrally formed with the second base wall and rising upwardly therefrom, where the tall support wall has a second height which is taller than the first height of the short support wall;
a seat cushion;
a cushion storage mechanism that is provided between each of the first and second seat support platforms and the seat cushion and is capable of moving the seat cushion from an in-use position to a storage position, which is lower than and to the rear of the in-use position;
a seat back that is supported on the first and second seat support platforms so as to be pivotable between a raised position at which the seat back rises above the seat cushion and a dropped-down position at which the seat back is superimposed on the seat cushion;
a reclining mechanism that is provided between one of the first and second seat support platforms and the seat back and is capable of selectively holding the seat back at the raised position and the dropped-down position; and
a coupling mechanism that provides a link between the reclining mechanism and the cushion storage mechanism so as to move the seat cushion from the in-use position to the storage position in association with pivoting of the seat back from the raised position to the dropped-down position,
wherein:
the seat cushion comprises a cushion frame that extends along front, rear, left, and right faces of the seat cushion and has the cushion storage mechanism linked thereto,
the seat back comprises a back frame that extends along upper, lower, left, and right faces of the seat back and has the reclining mechanism linked thereto,
the cushion storage mechanism is arranged so as to hold the cushion frame in a state in which it is inclined upwardly toward the front when the seat cushion is at the in-use position and hold the cushion frame in a substantially horizontal state when at the storage position,
the reclining mechanism is arranged so as to hold the back frame in a substantially horizontal state when the seat back is at the dropped-down position,
the first and second seat support platforms are distanced from each other in a widthwise direction of the seat cushion and the seat back, and
wherein the floor comprises a wheel house, an elevated surface and a low surface wherein the elevated surface is separate and distinct from the wheel house, and the first seat platform is mounted on the elevated surface of the floor which is higher than the low surface of the floor on which the second seat platform is mounted.

24. The automotive folding seat device according to claim 23, wherein the cushion frame and the back frame are arranged such that when the seat device is in a folded state in which the seat cushion has been moved to the storage position and the seat back has been moved to the dropped-down position, left and right side parts of the cushion frame and left and right side parts of the back frame are superimposed when viewed from above.

25. The automotive folding seat device according to claim 23, wherein the cushion storage mechanism comprises a front swing arm having one end linked to each of the first and second seat support platforms via a first pivot and the other end linked to a side face of a front end part of the cushion frame via a second pivot and a rear swing arm having one end linked to the seat support platform via a third pivot and the other end linked to a side face of a rear end part of the cushion frame via a fourth pivot and having an effective length shorter than the effective length of the front swing arm, and pivoting the front swing arm from a substantially vertical raised attitude to a rearwardly collapsed attitude and pivoting the rear swing arm from a forwardly jutting-out attitude to a hanging-down attitude enables the storage position to be obtained for the seat cushion in which the cushion frame is in a substantially horizontal state.

26. The automotive folding seat device according to claim 25, wherein when the seat cushion is at the in-use position, the center of the second pivot is disposed so as to have an offset upward relative to a central axis of a side part of the cushion frame, whereas the center of the fourth pivot is disposed so as to have an offset downward relative to the central axis of the side part of the cushion frame.

27. The automotive folding seat device according to claim 1, wherein the seat cushion is arranged such that at the storage position at least part of the cushion frame is present at a position lower than the elevated surface.

28. The automotive folding seat device according to claim 3, wherein a recess is provided at the front end of the seat cushion, the recess being capable of housing the headrest when the seat back is dropped down.

29. The automotive folding seat device according to claim 20, wherein the coupling mechanism is formed from a lateral spacer integrally linking the rear swing arm and the reclining base.

* * * * *